United States Patent
Wang et al.

(10) Patent No.: US 9,429,684 B2
(45) Date of Patent: Aug. 30, 2016

(54) PRIMARY AMINE-CONTAINING SILICONE HYDROGEL CONTACT LENSES AND RELATED COMPOSITIONS AND METHODS

(71) Applicant: CooperVision International Holding Company, LP, St. Michael (BB)

(72) Inventors: Guigui Wang, Livermore, CA (US); Hong Xue, Pleasanton, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

(21) Appl. No.: 14/781,041

(22) PCT Filed: Apr. 30, 2014

(86) PCT No.: PCT/GB2014/051350
§ 371 (c)(1),
(2) Date: Sep. 29, 2015

(87) PCT Pub. No.: WO2014/177871
PCT Pub. Date: Nov. 6, 2014

(65) Prior Publication Data
US 2016/0054475 A1    Feb. 25, 2016

Related U.S. Application Data

(60) Provisional application No. 61/817,606, filed on Apr. 30, 2013.

(51) Int. Cl.
| | |
|---|---|
| *B65B 25/00* | (2006.01) |
| *G02B 1/04* | (2006.01) |
| *B29C 35/00* | (2006.01) |
| *B29K 33/00* | (2006.01) |
| *B29L 11/00* | (2006.01) |

(52) U.S. Cl.
CPC .............. *G02B 1/043* (2013.01); *B29C 35/00* (2013.01); *B65B 25/008* (2013.01); *B29K 2033/12* (2013.01); *B29L 2011/0041* (2013.01)

(58) Field of Classification Search
CPC .......................... B65B 25/008; G02B 1/043
USPC .............. 53/431; 351/159.02; 523/106–108
See application file for complete search history.

(56) References Cited

U.S. PATENT DOCUMENTS

| | | | |
|---|---|---|---|
| 5,817,924 A | 10/1998 | Tuomela et al. | |
| 5,849,811 A | 12/1998 | Nicolson et al. | |
| 5,944,853 A | 8/1999 | Molock et al. | |
| 6,436,481 B1 | 8/2002 | Chabrecek et al. | |
| 7,216,975 B2 | 5/2007 | Hong | |
| 2005/0013842 A1* | 1/2005 | Qiu et al. ............. | G02B 1/043 424/423 |
| 2006/0105026 A1 | 5/2006 | Fortune et al. | |
| 2007/0286891 A1 | 12/2007 | Kettlewell et al. | |
| 2008/0143003 A1* | 6/2008 | Phelan ................. | G02B 1/043 351/159.28 |
| 2009/0018575 A1 | 1/2009 | Fortune et al. | |
| 2009/0234089 A1 | 9/2009 | Ueyama et al. | |
| 2010/0120939 A1 | 5/2010 | Phelan | |
| 2011/0102736 A1 | 5/2011 | Wu et al. | |
| 2011/0134387 A1* | 6/2011 | Samuel et al. ....... | G02B 1/043 351/159.33 |
| 2012/0026457 A1 | 2/2012 | Qiu et al. | |
| 2012/0026458 A1* | 2/2012 | Qiu et al. ............. | G02B 1/043 351/159.33 |
| 2012/0220743 A1* | 8/2012 | Francis et al. ....... | C08F 230/08 526/279 |
| 2013/0150809 A1* | 6/2013 | Whiteford et al. ... | A01N 43/90 351/159.02 |

FOREIGN PATENT DOCUMENTS

| | | | | |
|---|---|---|---|---|
| WO | 9300391 A1 | 1/1993 | | |
| WO | 9305085 A1 | 3/1993 | | |
| WO | 2008116131 A2 | 9/2008 | | |
| WO | WO 2012016096 A1 * | 2/2012 | ............. | G02B 1/043 |
| WO | 2012118673 A2 | 9/2012 | | |

OTHER PUBLICATIONS

International Search Report and Written Opinion issued in corresponding International Patent Application No. PCT/GB2014/051350 dated Jul. 14, 2014 (12 pages).

International Preliminary Report on Patentability issued in corresponding International Patent Application No. PCT/GB2014/051350 dated Mar. 31, 2015 (with Response to WO filed Feb. 20, 2015 and Article 34 claims) (14 pages).

Office Action received in corresponding Korean Patent Application No. 10-2015-7033573 dated Jan. 6, 2016 with English translation (16 pages).

Office Action received in corresponding Chinese Patent Application No. 201480024720.X dated May 5, 2016 with English translation (9 pages).

\* cited by examiner

*Primary Examiner* — Stephen F Gerrity
(74) *Attorney, Agent, or Firm* — Kilyk & Bowersox, P.L.L.C.

(57) ABSTRACT

Miscible polymerizable compositions comprising at least one primary amine-containing methacrylate monomer, or at least one primary amine-containing methacrylamide monomer, in addition to 20-80 wt. % siloxane monomer, 20-80 wt. % hydrophilic monomer, cross-linking agent, and polymerization initiator, are described. These polymerizable compositions can be used to form silicone hydrogel contact lenses, and in methods of manufacturing silicone hydrogel contact lenses.

22 Claims, No Drawings

PRIMARY AMINE-CONTAINING SILICONE HYDROGEL CONTACT LENSES AND RELATED COMPOSITIONS AND METHODS

This application is a National Stage Application of PCT/GB2014/051350, filed Apr. 30, 2014, which claims the benefit under 35 U.S.C. §119(e) of prior U.S. Provisional Patent Application No. 61/817,606, filed Apr. 30, 2013, which is incorporated in its entirety by reference herein.

FIELD

The present disclosure is directed to silicone hydrogel contact lenses and related compositions and methods.

BACKGROUND

Commercially and clinically, silicone hydrogel contact lenses are a popular alternative to conventional hydrogel contact lenses (i.e., hydrogel contact lenses that do not contain silicon or silicon-containing ingredients). Over the past decade, the use of silicone hydrogel contact lenses has steadily increased due in large part to their higher levels of oxygen permeability as compared to conventional hydrogel materials, allowing greater concentrations of oxygen to reach the cornea during wear. While the siloxane monomers present in the lens formulations result in the higher levels of oxygen permeability, these hydrophobic monomers also limit the types and amounts of other ingredients which can be combined to form miscible polymerizable compositions that polymerizes to form clear polymer lens bodies free of unwanted color.

Increasing competition in the field of silicone hydrogel contact lenses demands that new lenses be developed having new or improved properties. For example, there is interest in developing anti-microbial contact lenses to reduce the incidence of bacterial infection in the eye, anti-allergy contact lenses for lens wearers who suffer from seasonal allergies, contact lenses having wetting agents attached to the lens for lens wearers who suffer from dry eye conditions, etc.

One method of providing conventional hydrogel contact lenses with new or improved properties has been described in International Publication No. WO 93/00391, which is incorporated herein in its entirety. WO 93/00391 describes polymeric substrates having functional groups in the substrate polymer chain, and reacting the functional groups with complementary functional groups on a hydrophilic coating polymer in a predominately aqueous medium to form covalent linkages between the coating polymer and the substrate polymer.

Examples of lens formulations comprising a primary amine-containing monomer can be found in Example 18 of U.S. Patent Application Publication No. US 2012/0026457, which is incorporated herein in its entirety. The polymerizable compositions of lens formulations D1, D2 and D3 of Example 18 of US 2012/0026457 each contains less than 20 wt. % of hydrophilic monomer.

There is a need for new silicone hydrogel contact lenses with favorable properties such as relatively high water contents, relatively high levels of oxygen permeability, and ophthalmically acceptable modulii, new polymerizable compositions for forming silicone hydrogel contact lenses which comprise relatively high amounts of hydrophilic monomers and siloxane monomers, and new methods of manufacturing silicone hydrogel contact lenses which allow various types of agents to be attached to the lenses to modify the lenses under conditions which are acceptable for manufacturing of a medical device, are needed.

SUMMARY

The present disclosure is directed to primary amine-containing silicone hydrogel contact lenses, and methods of manufacturing the primary amine-containing silicone hydrogel contact lenses, including miscible polymerizable compositions used in forming the polymeric lens bodies of the primary amine-containing silicone hydrogel contact lenses. Due to the presence of the primary amine groups in the polymeric lens bodies of the present disclosure, it is possible to covalently bond various types of agents to the lens bodies through covalent amine bonds such as, for example, amine-ester, amine-aldehyde, amine-ketone, or amine-carboxylic acid bonds. Covalently bonding agents to the polymeric lens body through amine bonds makes it possible to add various types of agents and/or properties to the polymeric lens bodies without the need to alter the polymerizable composition used to form the lens body.

As used herein, the primary amine-containing silicone hydrogel contact lens is understood to refer to a silicone hydrogel contact lens which comprises a polymeric lens body comprising a plurality of primary amine functional groups present in its polymeric structure. The plurality of primary amine functional groups of the polymeric lens body are provided by polymerized units of at least one primary amine-containing methacrylate monomer or polymerized units of at least one primary amine-containing methacrylamide monomer.

When the polymeric lens body having the plurality of primary amine functional groups is provided in an aqueous solution comprising an agent having an attached one or more complementary functional groups (i.e., functional groups which form covalent bonds with primary amine groups under aqueous conditions), the plurality of primary amine functional groups of the polymeric lens body form covalent bonds with the complementary functional groups of the agent having the attached one or more of said complementary functional groups. Thus, the agent becomes covalently bonded to the polymeric lens body.

Due to the presence of the primary amine functional groups present in the polymeric structure of the polymeric lens body, it is possible to combine various types of agents with the polymeric lens body in order to give the contact lens various types of properties, depending upon the type of agent(s) chosen, as long as the agent(s) comprise at least one complementary functional group which covalently bonds with a primary amine group under aqueous conditions. For example, the agent can be an anti-microbial agent, or an anti-allergy agent, or another type of pharmacological agent, or a wetting agent, or a linking agent, etc., or any combination thereof.

However, it is not necessary to contact the polymeric lens body with an agent comprising at least one complementary functional group.

When hydrated, the primary amine-containing silicone hydrogel contact lenses have an equilibrium water content of at least 30%, an oxygen permeability of at least 30 barrers, and a modulus of 0.3 to 1.2 MPa. The polymeric lens body of the silicone hydrogel contact lens is the reaction product of a miscible polymerizable composition comprising (a) at least one siloxane monomer in an amount of from 20 to 80 weight percent; (b) at least one hydrophilic monomer in an amount of from 20 to 80 weight percent; (c) at least one cross-linking agent; (d) at least one polymerization initiator;

and (e) at least one primary amine-containing methacrylate monomer or at least one primary amine-containing methacrylamide monomer, wherein the weight percent is based on total weight percent of the polymerizable composition.

In one example of the silicone hydrogel contact lens, and of the polymerizable composition used in forming the lens, the at least one primary amine-containing methacrylate monomer or the at least one primary amine-containing methacrylamide monomer can be present in free base form. In another example, at least one primary amine-containing methacrylate monomer or the at least one primary amine-containing methacrylamide monomer can be present in salt form such as, for example, a hydrochloride salt.

In another example of the silicone hydrogel contact lens, and of the polymerizable composition used in forming the lens, the at least one primary amine-containing methacrylate monomer or the at least one primary amine-containing methacrylamide monomer can be present in the polymerizable composition in an amount of at least 0.2 weight percent. In another example, the at least one primary amine-containing methacrylate monomer or the at least one primary amine-containing methacrylamide monomer can be present in the polymerizable composition in an amount of at least 0.5 weight percent, or of at least 0.75 weight percent, or of at least 1.0 weight percent, or of at least 1.5 weight percent.

In another example of the silicone hydrogel contact lens, and of the polymerizable composition used in forming the lens, the at least one primary amine-containing methacrylate monomer or the at least one primary amine-containing methacrylamide monomer can be an alkane chain-containing primary amine-containing methacrylate monomer or an alkane chain-containing primary amine-containing methacrylamide monomer having an alkane chain which is from 2 to 8 carbons in length. In another example, the alkane chain-containing primary amine-containing methacrylate monomer or alkane chain-containing primary amine-containing methacrylamide monomer can have an alkane chain from 2 to 6 carbons in length, or from 4 to 6 carbons in length, or from 2 to 4 carbons in length. In another example, the at least one primary amine-containing methacrylate monomer or the at least one primary amine-containing methacrylamide monomer can be an alkane chain-containing primary amine-containing methacrylamide monomer having an alkane chain which is from 2 to 8 carbons in length. In yet another example, the alkane chain-containing primary amine-containing methacrylate monomer or alkane chain-containing primary amine-containing methacrylamide monomer can have an alkane chain from 2 to 6 carbons in length, or from 4 to 6 carbons in length, or from 2 to 4 carbons in length.

In another example of the silicone hydrogel contact lens, and of the polymerizable composition used in forming the lens, the miscible polymerizable composition can be essentially free (e.g., less than 0.5% by wt based on the composition) or free of an organic solvent or organic diluent. Alternatively, the polymerizable composition can include an organic solvent or organic diluent. The organic solvent or organic diluent can be present in the polymerizable composition in an amount less than 15 weight percent, or in an amount less than 10 weight percent.

In yet another example of the silicone hydrogel contact lens, and of the polymerizable composition used in forming the lens, the at least one hydrophilic monomer of the miscible polymerizable composition can comprise an N-vinyl amide-containing hydrophilic monomer. Examples of N-vinyl amide-containing hydrophilic monomers include N-vinyl pyrrolidone (NVP) and N-vinyl-N-methyl acetamide (VMA), among others.

In a particular example of the silicone hydrogel contact lens, and of the polymerizable composition used in forming the lens, the at least one hydrophilic monomer of the miscible polymerizable composition can comprise an N-vinyl amide-containing hydrophilic monomer, and the at least one primary amine-containing methacrylate monomer or the at least one primary amine-containing methacrylamide monomer can comprise at least one primary amine-containing methacrylamide monomer. The at least one primary amine-containing methacrylamide monomer can be an alkane chain-containing primary amine-containing methacrylamide monomer having an alkane chain which is from 2 to 8 carbons in length, or from 2 to 6 carbons in length, or from 4 to 6 carbons in length, or from 2 to 4 carbons in length. The at least one primary amine-containing methacrylamide monomer can be selected from the group consisting from a form of N-(2-Amino-ethyl)methacrylamide (AEMAA) monomer, a form of N-(3-Amino-propyl)methacrylamide (APMAA) monomer, and any combination thereof. The at least one primary amine-containing methacrylamide monomer can be a form of N-(3-Amino-propyl)methacrylamide (APMAA) monomer.

The silicone hydrogel contact lens, and the polymerizable composition used in forming the lens, can comprise at least one siloxane monomer having a number average molecular weight of less than 1,000 daltons.

The silicone hydrogel contact lens, and the polymerizable composition used in forming the lens, can comprise at least one siloxane monomer selected from the group consisting of: a silicon-containing vinyl carbonate monomer, a silicon-containing vinyl carbamate monomer, a monomethacryloxypropyl terminated polydimethylsiloxane monomer, a monomethacryloxypropyl terminated mono-n-butyl terminated polydimethyl siloxane monomer, and any combination thereof.

In a particular example of the silicone hydrogel contact lens, and of the polymerizable composition used in forming the lens, the at least one siloxane monomer can comprise a siloxane monomer represented by formula (1):

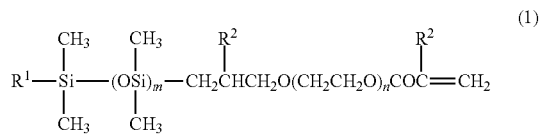

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the siloxane monomer optionally having a number average molecular weight of from 400 daltons to 700 daltons. The number average molecular weight can be, and preferably is determined by the ordinary arithmetic mean of the individual macromolecules, or can be the average of the molecular masses of the individual macromolecules. The number average molecular mass of a polymer can be determined by gel permeation chromatography, viscometry via the (Mark-Houwink equation), colligative methods such as vapor pressure osmometry, end-group determination or proton NMR. For example, the number average molecular weight (in units of Daltons) of a monomer may be determined by $^1$H NMR end-group analysis.

The silicone hydrogel contact lens can be a primary amine-containing silicone hydrogel contact lens in which said complementary functional groups attached to said agent are covalently bonded to said plurality of primary amine functional groups of the polymeric lens body. For example, the complementary functional group attached to the agent can comprise an ester, an aldehyde, a ketone, or a carboxylic acid functional group, and the plurality of primary amine functional groups of the polymeric lens body can be covalently bonded to the complementary functional groups attached to the agent through an amine-ester, an amine-aldehyde, an amine-ketone, or an amine-carboxylic acid bond, respectively. As covalent bonds are present between the complementary functional groups of the agent and the plurality of primary amine groups of the polymeric lens body, the agent is thereby attached to the polymeric lens body.

In a particular example of the silicone hydrogel contact lens, the complementary functional group of the agent can be an ester group such as, for example, an N-hydroxyl succinimide (NHS) group, and the covalent bond can be an amine-ester bond such as, for example, an amide-succinimide ester bond.

In another example of the silicone hydrogel contact lens, the agent having the attached one or more of said complementary functional groups can be a wetting agent or a linking agent.

In another example of the silicone hydrogel contact lens, the agent having the attached one or more of said complementary functional groups can be a wetting agent, and the silicone hydrogel contact lens having the attached agent can be contact lens having a contact angle of less than 70 degrees, or of less than 60 degrees, or of less than 50 degrees. For example, the contact angle can be from 0 to 69 degrees, or from 0 to 59 degrees, or from 0 to 49 degrees.

In yet another example of the silicone hydrogel contact lens, the agent having the attached one or more of said complementary functional groups can be a polymer having at least one attached complementary functional group.

In a particular example of the silicone hydrogel contact lens, the agent can be a polymeric wetting agent having an attached ester group such as, for example, an N-hydroxyl succinimide (NHS) group. The silicone hydrogel contact lens having the attached polymeric wetting agent having an NHS group can have a contact angle of less than 70 degrees, for example, including less than 60 degrees, or less than 50 degrees. For example, the contact angle can be from 0 to 69 degrees, or from 0 to 59 degrees, or from 0 to 49 degrees.

As stated above, the present disclosure is also directed to a method of manufacturing the primary amine-containing silicone hydrogel contact lenses disclosed herein. The method of manufacturing a silicone hydrogel contact lens comprises: providing a miscible polymerizable composition, said polymerizable composition comprising (a) at least one siloxane monomer in an amount of from 20 to 80 weight percent; (b) at least one hydrophilic monomer in an amount of from 20 to 80 weight percent; (c) at least one cross-linking agent; (d) at least one polymerization initiator; and (e) at least one primary amine-containing methacrylate monomer or at least one primary amine-containing methacrylamide monomer. The method also comprises the step of polymerizing the polymerizable composition in a contact lens mold assembly to form a polymeric lens body having, when hydrated, an equilibrium water content of at least 30%, an oxygen permeability of at least 30 barrers, and a modulus of 0.3 to 1.2 MPa; the polymeric lens body comprising a plurality of primary amine functional groups provided by polymerized units of the at least one primary amine-containing methacrylate monomer or the at least one primary amine-containing methacrylamide monomer. The method also comprises the steps of separating the polymeric lens body from the mold assembly; contacting the separated polymeric lens body with an aqueous solution comprising an agent having an attached one or more complementary functional groups, forming covalent bonds between the one or more complementary functional groups of the agent and the plurality of primary amine functional groups of the polymeric lens body, thereby attaching the agent to the contacted polymeric lens body; and packaging the contacted polymeric lens body in a contact lens packaging solution in a contact lens package to form a finished contact lens.

In one example, the method of manufacturing the silicone hydrogel contact lens can comprise a method wherein the separating the polymeric lens body from the mold assembly uses a mechanical demolding process which does not involve applying a liquid to the polymeric lens body or the mold assembly, or the separating the polymeric lens body from the mold assembly uses a mechanical delensing process which does not involve applying a liquid to the polymeric lens body or a mold section, or uses both a mechanical demolding process which does not involve applying a liquid to the polymeric lens body or the mold assembly and a mechanical delensing process which does not involve applying a liquid to the polymeric lens body or a mold section.

In another example, the method of manufacturing the silicone hydrogel contact lens can comprise a method wherein the step of contacting the separated polymeric lens body with an aqueous solution comprising an agent is conducted at a temperature of from 20 to 60° C., or of from 20 to 40° C., or of 20 to 30° C., or of from 20 to 25° C. In another example, the contacting can be conducted at a pH range of from 6.0 to 8.0, or of from 6.5 to 7.5, or can be conducted at a pH of about 7. In yet another example, the contacting is conducted at a temperature of from 20 to 60° C., or is conducted at a pH of from 5.0 to 9.0, or is conducted at both a temperature of from 20 to 60° C. and at a pH of from 5.0 to 9.0. In another example, the method of manufacturing the silicone hydrogel contact lens can further comprise a step of extracting the separated polymeric lens body, or extracting the contacted polymeric lens body, or extracting the separated polymeric lens body and extracting the contacted polymeric lens body, to remove unreacted monomer. The extracting can be done using an extraction media essentially free of an organic solvent, or can be done using an extraction media comprising an organic solvent such as, for example, an alcohol, depending upon the hydrophilicity, toxicity and amount of unreacted monomer present which is present in the polymeric lens body before extraction.

The method of manufacturing the silicone hydrogel contact lens of the present disclosure can further comprise a step of washing the contacted polymeric lens body prior to the packaging. For example, the washing step can be effective to remove excess agent from the polymeric lens body which did not covalently bond to the lens body during the contacting step, or the washing can be effective to neutralize the pH if the contacting step is conducted at a pH other than neutral pH.

In a particular example, the method of manufacturing the silicone hydrogel contact lens can be a method wherein the finished contact lens has a contact angle at least 10 degrees lower than a contact angle of a contact lens made using the same polymerizable composition and using the same method of manufacture except without the step of contacting the separated polymeric lens body with the aqueous solution of the agent. The agent used during the contacting step can be a polymeric wetting agent having an attached ester group such as, for example, an N-hydroxyl succinimide (NHS) group.

In any example of the methods of the present disclosure, the silicone hydrogel contact lens can comprise the silicone hydrogel contact lens of any one or combination of the examples previously described.

In any example of the methods of the present disclosure, the polymerizable composition can comprise the polymerizable composition of any one or combination of the examples previously described.

In any example of the methods of the present disclosure, the agent having the attached one or more of said complementary functional groups can comprise the agent of any one or combination of the examples previously described.

DETAILED DESCRIPTION

Primary amine-containing silicone hydrogel contact lens, miscible polymerizable compositions comprising primary-amine-containing monomers used in forming the primary amine-containing silicone hydrogel contact lenses, and methods of manufacturing the primary amine-containing silicone hydrogel contact lenses have been discovered.

It has been found that it is possible to prepare miscible polymerizable compositions by using at least one primary amine-containing methacrylate monomer or at least one primary methacrylamide monomer in the polymerizable composition. In addition to the at least one primary amine-containing methacrylate monomer or at least one primary methacrylamide monomer in the polymerizable composition, the polymerizable composition comprises (a) at least one siloxane monomer in an amount of from 20 to 80 weight percent; (b) at least one hydrophilic monomer in an amount of from 20 to 80 weight percent; (c) at least one cross-linking agent; and (d) at least one polymerization initiator. These polymerizable compositions are miscible polymerizable compositions which, when polymerized, produce cosmetically acceptable contact lenses which are ophthalmically acceptable clear and free of unwanted color (e.g., not yellow or brown in color unless yellow or brown tint has been added intentionally).

When polymerized, the reaction product of the polymerizable composition is a polymeric lens body having, when hydrated, an equilibrium water content of at least 30%, an oxygen permeability of at least 30 barrers, and a modulus of 0.3 to 1.2 MPa. Additionally, the polymeric lens body comprises a plurality of primary amine functional groups provided by polymerized units of the at least one primary amine-containing monomer, and the plurality of primary amine functional groups form covalent bonds with complementary functional groups when the polymeric lens body is provided in an aqueous solution comprising an agent having an attached one or more of said complementary functional groups.

In one example of the silicone hydrogel contact lens, and of the polymerizable composition used in forming the lens, the at least one primary amine-containing methacrylate monomer or the at least one primary amine-containing methacrylamide monomer can be present in free base form. In another example, the at least one primary amine-containing methacrylate monomer or the at least one primary amine-containing methacrylamide monomer can be present in salt form. In yet another example the at least one primary amine-containing methacrylate monomer or the at least one primary amine-containing methacrylamide monomer can be present as a hydrochloride salt.

In another example of the silicone hydrogel contact lens, and of the polymerizable composition used in forming the lens, the at least one primary amine-containing methacrylate monomer or the at least one primary amine-containing methacrylamide monomer can be present in the polymerizable composition in an amount of at least 0.2 weight percent. In another example, the at least one primary amine-containing methacrylate monomer or the at least one primary amine-containing methacrylamide monomer can be present in the polymerizable composition in an amount of at least 0.5 weight percent, or of at least 0.7 weight percent, or of at least 1.0 weight percent, or of at least 1.5 weight percent, or of at least 2.0 weight percent. In another example, the at least one primary amine-containing methacrylate monomer or the at least one primary amine-containing methacrylamide monomer can be present in the polymerizable composition in an amount of less than 20 weight percent, or of less than 10 weight percent, or of less than 15 weight percent. In yet another example, the at least one primary amine-containing methacrylate monomer or the at least one primary amine-containing methacrylamide monomer can be present in the polymerizable composition in an amount of from 0.2 to 20.0 weight percent, or of from 0.5 to 15.0 weight percent, or of from 0.7 to 10.0 weight percent, or of from 1.0 to 5.0 weight percent, or of from 1.0 to 3.0 weight percent.

In another example of the silicone hydrogel contact lens, and of the polymerizable composition used in forming the lens, the at least one primary amine-containing methacrylate monomer or the at least one primary amine-containing methacrylamide monomer can be an alkane chain-containing primary amine-containing methacrylate monomer having an alkane chain which is from 2 to 8 carbons in length or an alkane chain-containing primary amine-containing methacrylamide monomer having an alkane chain which is from 2 to 8 carbons in length. In another example, the alkane chain-containing primary amine-containing methacrylate monomer or alkane chain-containing primary amine-containing methacrylamide monomer can have an alkane chain from 2 to 6 carbons in length, or from 4 to 6 carbons in length, or from 2 to 4 carbons in length.

In yet another example of the silicone hydrogel contact lens, and of the polymerizable composition used in forming the lens, the at least one primary amine-containing methacrylate monomer or the at least one primary amine-containing methacrylamide monomer can be an alkane chain-containing primary amine-containing methacrylamide monomer having an alkane chain which is from 2 to 8 carbons in length. In another example, the alkane chain-containing primary amine-containing methacrylamide monomer can have an alkane chain from 2 to 6 carbons in length, or from 4 to 6 carbons in length, or from 2 to 4 carbons in length.

In one example of the silicone hydrogel contact lens, and of the polymerizable composition used in forming the lens, the alkane chain-containing primary amine-containing methacrylate having an alkane chain which is from 2 to 8 carbons in length or alkane chain-containing primary amine-containing methacrylamide monomer having an alkane chain which is from 2 to 8 carbons in length can have a structure represented by formula (2):

METH-ALKANE-1° AMINE (2)

wherein METH of formula (2) represents a methacrylate or methacrylamide functional group, ALKANE of formula (2) represents an alkane chain from 2 to 8 carbons in length, and 1° AMINE of formula (2) represents a primary amine functional group.

In another example of the silicone hydrogel contact lens, and of the polymerizable composition used in forming the lens, the alkane chain-containing primary amine-containing methacrylamide monomer having an alkane chain which is from 2 to 8 carbons in length can have a structure represented by formula (2), wherein METH of formula (2) represents a methacrylamide functional group, ALKANE of formula (2) represents an alkane chain from 2 to 8 carbons in length, and 1° AMINE of formula (2) represents a primary amine functional group.

In another example of the silicone hydrogel contact lens, and of the polymerizable composition used in forming the lens, the at least one primary amine-containing methacrylate monomer or the at least one primary amine-containing methacrylamide monomer can have a structure represented by formula (2), wherein METH of formula (2) represents a methacrylamide functional group, ALKANE of formula (2) represents an alkane chain from 2 to 6 carbons in length, and 1° AMINE of formula (2) represents a primary amine functional group.

In another example of the silicone hydrogel contact lens, and of the polymerizable composition used in forming the lens, the at least one primary amine-containing methacrylate monomer or the at least one primary amine-containing methacrylamide monomer can have a structure represented by formula (2), wherein METH of formula (2) represents a methacrylamide functional group, ALKANE of formula (2) represents an alkane chain from 2 to 4 carbons in length, and 1° AMINE of formula (2) represents a primary amine functional group.

In another example of the silicone hydrogel contact lens, and of the polymerizable composition used in forming the lens, the at least one primary amine-containing methacrylate monomer or the at least one primary amine-containing methacrylamide monomer can have a structure represented by formula (2), wherein METH of formula (2) represents a methacrylamide functional group, ALKANE of formula (2) represents an alkane chain from 4 to 6 carbons in length, and 1° AMINE of formula (2) represents a primary amine functional group.

In yet another example of the silicone hydrogel contact lens, and of the polymerizable composition used in forming the lens, the at least one primary amine-containing methacrylate monomer or the at least one primary amine-containing methacrylamide monomer can have a structure represented by formula (2), wherein METH of formula (2) represents a methacrylate functional group, ALKANE of formula (2) represents an alkane chain from 2 to 6 carbons in length, and 1° AMINE of formula (2) represents a primary amine functional group.

In one example, the at least one primary amine-containing methacrylate or at least one primary amine-containing methacrylamide monomer can be selected from the group consisting from a form of 2-Aminoethyl methacrylate (AEMA) monomer, a form of N-(2-Amino-ethyl)methacrylamide (AEMAA) monomer, a form of N-(3-Amino-propyl)methacrylamide (APMAA) monomer, and any combination thereof.

In another example, the at least one primary amine-containing methacrylate or at least one primary amine-containing methacrylamide monomer can be selected from the group consisting from a form of N-(2-Amino-ethyl) methacrylamide (AEMAA) monomer, a form of N-(3-Amino-propyl)methacrylamide (APMAA) monomer, and any combination thereof.

In yet another example, the at least one primary amine-containing methacrylate or at least one primary amine-containing methacrylamide monomer can be a form of N-(3-Amino-propyl)methacrylamide (APMAA) monomer.

In one example of the silicone hydrogel contact lens, and of the polymerizable composition used in forming the lens, the miscible polymerizable composition can be essentially free of an organic solvent or diluent. Alternatively, the polymerizable composition can include an organic solvent or diluent. The organic solvent or diluent can be present in the polymerizable composition in an amount of less than 15 weight percent, or in an amount of less than 10 weight percent, or in an amount of less than 5 weight percent. In a particular example, the polymerizable composition can comprise an alkane chain-containing primary amine-containing methacrylamide monomer having an alkane chain which is from 2 to 8 carbons in length, and can comprise an organic solvent or diluent in an amount of less than 15 weight percent.

As previously discussed, the polymerizable compositions described herein require the presence of at least one hydrophilic monomer. In one example, the at least one hydrophilic monomer can comprise hydroxyethyl methacrylate (HEMA), or a homolog of HEMA, or a combination thereof. The homolog of HEMA can be polyethoxy (10) ethyl methacrylate (HEMA-10). In another example, the at least one hydrophilic monomer can comprise HEMA. In yet another example, the at least one hydrophilic monomer can comprise HEMA in an amount of at least 30 weight percent, or at least 40 weight percent, or at least 50 weight percent of the polymerizable composition.

It has been found that hydroxyethyl methacrylate (HEMA) and monomers which are homologs of HEMA can be used in combination with primary amine-containing methacrylate monomers, or in combination with primary amine-containing methacrylamide monomers, or in combination with both primary amine-containing methacrylate monomers and primary amine-containing methacrylamide monomers, to produce miscible siloxane-containing polymerizable compositions that polymerize to into clear polymer lens bodies free of unwanted color. Thus, in one example of the silicone hydrogel contact lens, and of the polymerizable composition used in forming the lens, the at least one hydrophilic monomer of the miscible polymerizable composition can comprise at least one hydrophilic monomer selected from hydroxyethyl methacrylate (HEMA) and monomers which are homologs of HEMA, and the at least one primary amine-containing methacrylate monomer or at least one primary amine-containing methacrylamide monomer can comprise at least one primary amine-containing methacrylate monomer, or at least one primary amine-containing methacrylamide monomer, or both at least one primary amine-containing methacrylate monomer and at least one primary amine-containing methacrylamide monomer. The at least one hydrophilic monomer selected from hydroxyethyl methacrylate (HEMA) and monomers which are homologs of HEMA can be present in the polymerizable composition in an amount of at least 30 weight percent, and the at least one primary amine-containing methacrylate monomer, or at least one primary amine-containing methacrylamide monomer, or both at least one primary amine-containing methacrylate monomer and at least one primary amine-containing methacrylamide monomer can be present in the polymerizable composition in an amount of at least 0.5 weight percent.

It has been found that N-vinyl amide-containing hydrophilic monomers have greater compatibility with primary amine-containing methacrylamide monomers. Specifically, N-vinyl amide-containing hydrophilic monomers can be used in combination with primary amine-containing methacrylamide monomers to produce miscible siloxane-containing polymerizable compositions that polymerize into clear polymer lens bodies free of unwanted color. The other primary amine-containing monomers tested, including primary amine-containing methacrylate monomers, when used in polymerizable compositions comprising N-vinyl amide-containing hydrophilic monomers, were found to produce yellow or brown-tinted lenses when polymerized. Thus, in one example of the silicone hydrogel contact lens, and of the polymerizable composition used in forming the lens, the at least one hydrophilic monomer of the miscible polymerizable composition can comprise at least one N-vinyl amide-containing hydrophilic monomer, and the at least one primary amine-containing methacrylate monomer or at least one primary amine-containing methacrylamide monomer can comprise at least one primary amine-containing methacrylamide monomer.

As used herein, an N-vinyl amide-containing hydrophilic monomer is understood to be a hydrophilic monomer having one N-vinyl amide group present in its molecular structure. The N-vinyl amide-containing hydrophilic monomer of the polymerizable compositions of the present disclosure can be N-vinyl formamide, or N-vinyl acetamide, or N-vinyl-N-ethyl acetamide, or N-vinyl isopropylamide, or N-vinyl-N-methyl acetamide (VMA), or N-vinyl pyrrolidone (NVP), or N-vinyl caprolactam, or any combination thereof. The N-vinyl amide-containing hydrophilic monomer can be N-vinyl-N-methyl acetamide (VMA), or N-vinyl pyrrolidone (NVP), or any combination thereof. The N-vinyl amide-containing hydrophilic monomer can be N-vinyl-N-methyl acetamide (VMA). The N-vinyl amide-containing hydrophilic monomer can be N-vinyl pyrrolidone (NVP).

In addition to HEMA, homologs of HEMA, and N-vinyl amide-containing hydrophilic monomers, examples of other hydrophilic monomers which can be included in the present polymerizable compositions can include, but are not limited to, N,N-dimethylacrylamide (DMA), or 2-hydroxyethyl acrylate, or 2-hydroxypropyl methacrylate, or 2-hydroxybutyl methacrylate (HOB), or 2-hydroxypropyl methacrylate (HOP), or 2-hydroxybutyl acrylate, or 4-hydroxybutyl acrylate glycerol methacrylate, or 2-hydroxyethyl methacrylamide, or polyethyleneglycol monomethacrylate, or methacrylic acid (MA), or acrylic acid, or N-carboxy-β-alanine N-vinyl ester, 1,4-butanediol vinyl ether (BVE), or ethylene glycol vinyl ether (EGVE), or diethylene glycol vinyl ether (DEGVE), or any combination thereof.

In one example, the at least one hydrophilic monomer does not comprise N,N-dimethylacrylamide (DMA). In other words, the polymerizable composition can be free of DMA. In one example, the at least one hydrophilic monomer can comprise HEMA, or at least one homolog of HEMA, or any combination thereof, and be free of DMA. In another example, the at least one hydrophilic monomer can comprise at least one N-vinyl amide-containing monomer and be free of DMA. In yet another example, the at least one hydrophilic monomer can comprise at least one N-vinyl amide-containing monomer, HEMA, and be free of DMA.

In a particular example of the silicone hydrogel contact lens, and of the polymerizable composition used in forming the lens, wherein the at least one N-vinyl amide-containing hydrophilic monomer comprises at least one N-vinyl amide-containing hydrophilic monomer, the at least one primary amine-containing methacrylamide monomer can comprise an alkane chain-containing primary amine-containing methacrylamide monomer having an alkane chain which is from 2 to 8 carbons in length, or from 2 to 6 carbons in length, or from 4 to 6 carbons in length, or from 2 to 4 carbons in length. The at least one primary amine-containing methacrylamide monomer can be present in the polymerizable composition in an amount of at least 0.5 weight percent. The at least one primary amine-containing methacrylamide monomer can comprise APMAA, or AEMAA, or a combination thereof. The at least one primary amine-containing methacrylamide monomer can comprise APMAA. The at least one primary amine-containing methacrylamide monomer can comprise AEMAA. The at least one N-vinyl amide-containing hydrophilic monomer can be present in the polymerizable composition in an amount of from 30 to 60 weight percent. The at least one N-vinyl amide-containing hydrophilic monomer can comprise NVP, VMA, and combinations thereof. The at least one N-vinyl amide-containing hydrophilic monomer can comprise NVP. The at least one N-vinyl amide-containing hydrophilic monomer can comprise VMA. The polymerizable composition can be free of DMA. The polymerizable composition can comprise less than 15 weight percent, or less than 10 weight percent, or less than 5 weight percent organic solvent or diluent.

The at least one N-vinyl amide-containing hydrophilic monomer of the polymerizable composition can comprise at least one N-vinyl amide-containing hydrophilic monomer in combination with at least a second hydrophilic monomer which is not an N-vinyl amide-containing hydrophilic monomer. The second hydrophilic monomer can comprise HEMA, or a monomer which is a HEMA homolog, or both HEMA and a monomer which is a HEMA homolog. The second hydrophilic monomer can comprise HEMA. The N-vinyl amide-containing hydrophilic monomer can comprise NVP, or VMA, or both. The second hydrophilic monomer can be present in the polymerizable composition in an amount of at least 5 weight percent, or at least 10 weight percent, or at least 15 weight percent. The second hydrophilic monomer can be present in an amount of from 1 to 15 weight percent. The N-vinyl amide-containing monomer can be present in the polymerizable composition in an amount of less than 50 weight percent, or less than 40 weight percent, or less than 35 weight percent.

As used herein, a cross-linking agent is understood to be a monomer having more than one polymerizable functional group as part of its molecular structure, such as two or three or four polymerizable functional groups, i.e., a multifunctional monomer such as a bifunctional or trifunctional or tetrafunctional monomer. Silicon-containing and silicon-free cross-linking agents can be used in the polymerizable composition of the present disclosure. Examples of silicon-free cross-linking agents include, for example, without limitation, allyl (meth)acrylate, or lower alkylene glycol di(meth)acrylate, or poly(lower alkylene) glycol di(meth)acrylate, or lower alkylene di(meth)acrylate, or divinyl ether, or divinyl sulfone, or di- and trivinylbenzene, or trimethylolpropane tri(meth)acrylate, or pentaerythritol tetra(meth)acrylate, or bisphenol A di(meth)acrylate, or methylenebis (meth)acrylamide, or triallyl phthalate and diallyl phthalate, or ethylene glycol dimethacrylate (EGDMA), or triethylene glycol dimethacrylate (TEGDMA), or triethylene glycol divinyl ether (TEGDVE), or any combination thereof.

The cross-linking agent can be a vinyl-containing cross-linking agent. As used herein, a vinyl-containing cross-linking agent is a monomer having at least two polymerizable carbon—carbon double bonds (i.e., at least two vinyl polymerizable functional groups) present in its molecular structure, where each of the at least two polymerizable carbon—carbon double bonds present in the vinyl polymerizable functional groups of the vinyl-containing cross-linking agent is less reactive than a carbon—carbon double bond present in an acrylate or methacrylate or methacrylamide polymerizable functional group. Although carbon—carbon double bonds are present in acrylate and methacrylate and methacrylamide polymerizable functional groups, as understood herein, cross-linking agents comprising one or more acrylate or methacrylate or methacrylamide polymerizable group (e.g., an acrylate-containing cross-linking agent or a methacrylate-containing or methacrylamide-containing cross-linking agent) are not considered to be vinyl-containing cross-linking agents. Polymerizable functional groups having carbon-carbon double bonds which are less reactive than the carbon—carbon double bonds of acrylate or methacrylate or methacrylamide polymerizable groups include, for example, vinyl amide, vinyl ester, vinyl ether and allyl ester polymerizable functional groups. Thus, as used herein, vinyl-containing cross-linking agents include, for example, cross-linking agents having at least two polymerizable functional groups selected from a vinyl amide, a vinyl ether, a vinyl ester, an allyl ester, and any combination thereof.

As used herein, a mixed vinyl-containing cross-linking agent is a cross-linking agent having at least one polymerizable carbon—carbon double bond (i.e., at least one vinyl polymerizable functional group) present in its structure which is less reactive than the carbon—carbon double bond present in an acrylate or methacrylate or methacrylamide polymerizable functional group, and at least one polymerizable functional group present in its structure having a carbon—carbon double bond which is at least as reactive as the carbon—carbon double bond in an acrylate or methacrylate or methacrylamide polymerizable functional group. In one example, the at least one cross-linking agent can comprise at least one mixed vinyl-containing cross-linking agent. The at least one mixed vinyl-containing cross-linking agent can comprise a cross-linking agent having at least one vinyl polymerizable group and at least one methacrylate or methacrylamide polymerizable group. The at least one mixed vinyl-containing cross-linking agent can be allyl methacrylate (AMA). The AMA can be present in the polymerizable composition in an amount of at least 0.1 weight percent, or at least 0.2 weight percent, or at least 0.3 weight percent. The AMA can be present in an amount of from 0.1 to 10.0 weight percent, or of from 0.2 to 5.0 weight percent.

The polymerizable compositions of the present disclosure comprise at least one polymerization initiator. The at least one polymerization initiator can comprise a UV-activated initiator, a thermally-activated initiator, or both. Examples of initiators include benzoin ethyl ether, or benzyl dimethyl ketal, or alpha, alpha-diethoxyacetophenone, or 2,4,6-trimethylbenzoyl diphenyl phosphine oxide, or benzoin peroxide, or t-butyl peroxide, or azobisisobutyronitorile, or azo-bisdimethylvaleronitorile, or diphenyl (2,4,6-trimethyl benzoyl) phosphine oxide, or benzoin methyl ether, or 1-hydroxycyclohexylphenyl ketone, or Darocur (available from BASF, Florham Park, N.J., USA), or Irgacur (also available from BASF), or 2,2'-azobis-2-methyl propanenitrile (VAZO-64 from E.I. DuPont de Nemours & Co., Wilmington, Del., USA), or 2,2'-azobis(2,4-dimethylpentanenitrile) (VAZO-52), or 1,1'-azo bis(cyanocyclohexane) (VAZO-88), or any combination thereof. The at least one polymerization initiator can be present in the polymerizable composition in an amount of at least 0.1 weight percent, or of at least 0.2 weight percent, or of at least 0.5 weight percent, or of at least 1.0 weight percent, or of at least 1.5 weight percent, or of at least 2.0 weight percent. The at least polymerization initiator can be present in an amount of from 0.1 to 5.0 weight percent.

It has been found that the primary amine-containing methacrylate and methacrylamide monomers are quite compatible with many siloxane monomers and hydrophilic monomer when the siloxane monomers and hydrophilic monomers are present in the polymerizable composition in the range of 20 to 80 weight percent. In some cases, the addition of an organic solvent or organic diluent will be required in order to achieve a miscible polymerizable composition. Thus, in one example, the polymerizable composition further comprises at least one organic solvent or organic diluent. The organic solvent or organic diluent can be present in an amount of at least 5 weight percent, or of at least 10 weight percent, or of at least 15 weight percent, or of at least 20 weight percent. The organic solvent or organic diluent can be present in an amount of from 0.5 to 30.0 weight percent, or of from 1.0 to 25.0 weight percent, or of from 2.0 to 20.0 weight percent.

In many polymerizable compositions, including those included as Examples, a miscible polymerizable composition was achieved without the addition of an organic solvent or organic diluent to the polymerizable composition. Thus, in another example, the polymerizable composition is essentially free of an organic solvent or organic diluent (e.g., the polymerizable composition contains less than 0.5 weight percent of an organic solvent or organic diluent based on the weight of the composition). In yet another example, the polymerizable composition can be free of an organic solvent or organic diluent.

In come polymerizable compositions, including those which comprise a HEMA-compatible siloxane monomer or a HEMA homolog-compatible siloxane monomer, a miscible polymerizable composition was achieved with the addition of water as a solvent or diluent. Thus, in one example, the polymerizable composition further comprises water as a solvent or diluent. The water can be present in the polymerizable composition in an amount of at least 5 weight percent, or of at least 10 weight percent, or of at least 15 weight percent, or of at least 20 weight percent. The water can be present in an amount of from 0.5 to 30.0 weight percent, or of from 1.0 to 25.0 weight percent, or of from 2.0 to 20.0 weight percent.

Alternatively, the polymerizable composition can be free of water.

As previously discussed, the at least one primary amine-containing methacrylate or primary amine-containing methacrylamide monomer can be present in the polymerizable composition in free base form, or in salt form. Under some conditions, it may be desirable to include a solution of a form of the primary amine-containing monomer in an organic solvent or organic diluent in the polymerizable composition. Thus, in yet another example, the polymerizable composition can comprise less than 7.5 weight percent of an organic solvent or organic diluent, or less than 5 weight percent of an organic solvent or organic diluent, or less than 2.5 weight percent of an organic solvent or organic diluent, or less than 1.0 weight percent of an organic solvent or organic diluent. For example, the polymerizable composition can comprise from 0.5 to 7.0 weight percent, or from 0.5 to 4.5 weight percent, or from 0.5 to 2.0 weight percent of an organic solvent or organic diluent.

The silicone hydrogel contact lens, and the polymerizable composition used in forming the lens, can be air cured (i.e., the polymerization reaction can be conducted under an air atmosphere, in the presence of oxygen, which can inhibit polymerization and yield poor results for some polymerizable compositions). Alternatively, the silicone hydrogel contact lens, and the polymerizable composition used in forming the lens can also be cured under an inert atmosphere such as under nitrogen.

As previously stated, the polymerizable composition of the present disclosure comprises at least one siloxane monomer in an amount of from 20 to 80 weight percent. The polymerizable composition of the present disclosure can comprise at least one siloxane monomer in an amount of from 20 to 50 weight percent. The at least one siloxane monomer can comprise a first siloxane monomer and a second siloxane monomer. The at least one siloxane monomer can consist of a first siloxane monomer and a second siloxane monomer. The at least one siloxane monomer can consist of a single siloxane monomer.

In one example, the at least one siloxane monomer can be a siloxane monomer having a linear siloxane backbone.

In another example, the at least one siloxane monomer can be a siloxane monomer which is not a hydroxyl-terminated siloxane monomer.

In yet another example, the at least one siloxane monomer can be a siloxane monomer having a linear siloxane backbone and which is not a hydroxyl-terminated siloxane monomer.

Alternatively, in another example, the at least one siloxane monomer can be a hydroxyl-terminated siloxane monomer. It has been found that hydroxyl-terminated siloxane monomers which are particularly compatible with hydroxyethyl methacrylate (HEMA) and monomers which are homologs of HEMA can be used in combination with primary amine-containing methacrylate monomers, or in combination with primary amine-containing methacrylamide monomers, or in combination with both primary amine-containing methacrylate monomers and primary amine-containing methacrylamide monomers, to produce miscible siloxane-containing polymerizable compositions that polymerize to into clear polymer lens bodies free of unwanted color. As used herein, a HEMA or HEMA homolog-compatible siloxane monomer is understood to be a siloxane monomer for which at least 20 weight percent of the siloxane monomer is miscible in a polymerizable composition comprising at least 20 weight percent HEMA or the HEMA homolog, (e.g., from 20 to 80 weight percent HEMA or the HEMA homolog) regardless of whether or not an organic solvent or water is present in the composition.

The at least one hydroxyl-terminated siloxane monomer can be a siloxane monomer represented by formula (3):

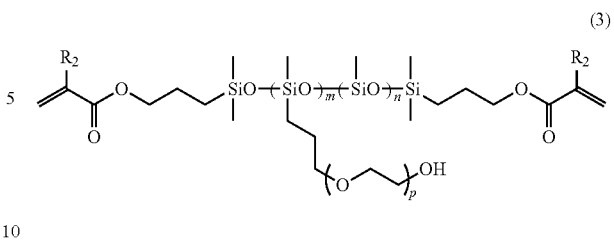

wherein $R_2$ of formula (3) is selected from either hydrogen or a methyl group, m of formula (3) is an integer of 6 to 50, n of formula (3) is an integer of 1 to 6, and p of formula (3) is an integer of 8 to 20. One particular example of a hydroxyl-terminated siloxane monomer is a siloxane monomer of formula (3) wherein $R_2$ of formula (3) is a methyl group, m of formula (3) is ~20, n is ~3, and p is ~16. The siloxane monomer had an HLB value of about 10 and a hydroxyl group content of about 1.2 wt. %. This hydroxyl-terminated siloxane monomer is referred to as SiO 3 and is used in some formulations of the Examples disclosed below. Hydroxyl-terminated siloxane monomers, including hydroxyl-terminated siloxane monomers of formula (3), and methods of preparing and purifying hydroxyl-terminated siloxane monomers are described in U.S. Provisional Patent Application Nos. 61/694,011, filed Aug. 28, 2012, and 61/786,761, filed Mar. 15, 2013, both of which are incorporated by reference in their entireties herein.

The at least one HEMA or HEMA homolog-compatible siloxane monomer can be a siloxane monomer represented by formula (4):

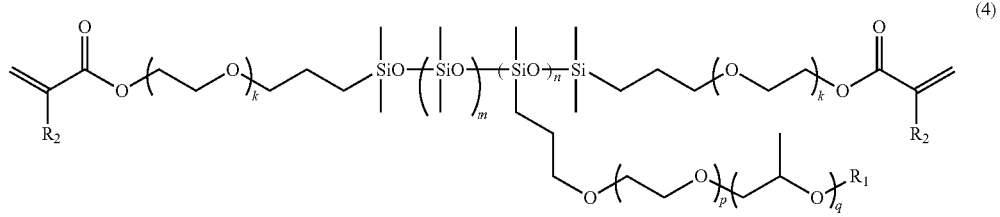

wherein $R_1$ and $R_2$ of formula (4) are independently selected from either hydrogen or a methyl group, k of formula (4) is an integer of 0 or 1, m of formula (4) is an integer of 0 to 160, n of formula (4) is an integer of 1 to 75, p of formula (4) is an integer of 0 to 40, and q of formula (4) is an integer of 0 to 20. In one particular example of a HEMA or HEMA homolog-compatible siloxane monomer of formula (4), k of formula (4) is an integer of 0 or 1, m of formula (4) is an integer of 6 to 100, n of formula (4) is an integer of 1 to 75, p of formula (4) is an integer of 1 to 40, and q of formula (4) is In another particular example of a HEMA or HEMA homolog-compatible siloxane monomer of formula (4), k of formula (4) is an integer of 0 or 1, m of formula (4) is an integer of 6 to 60, n of formula (4) is an integer of 1 to 10, p of formula (4) is an integer of 10 to 30, and q of formula (4) is 0. HEMA or HEMA homolog-compatible siloxane monomers, including HEMA or HEMA homolog-compatible siloxane monomers of formula (4), and methods of preparing and purifying HEMA or HEMA homolog-compatible siloxane monomers are described in U.S. Provisional Patent Application Nos. 61/694,011, filed Aug. 28, 2012, and 61/786,761, filed Mar. 15, 2013, both of which are incorporated by reference in their entireties herein.

In one example, the at least one siloxane monomer can comprise at least one siloxane monomer selected from the group consisting of: a silicon-containing vinyl carbonate monomer, a silicon-containing vinyl carbamate monomer, a monomethacryloxypropyl terminated polydimethylsiloxane monomer, a monomethacryloxypropyl terminated mono-n-butyl terminated polydimethyl siloxane monomer, and any combination thereof.

Thus, in one example of a formulation with a HEMA- or HEMA homolog-compatible siloxane monomer, the polymerizable composition can comprise at least one hydroxyl-terminated siloxane monomer in an amount of from 30 to 80 weight percent, at least one hydrophilic monomer selected from HEMA, homologs of HEMA, and combinations thereof, in an amount of at least 30 to 80 weight percent, and at least one primary amine-containing methacrylate monomer, or at least one primary amine-containing methacrylamide monomer. In another example, the polymerizable composition can comprise at least one hydroxyl-terminated siloxane monomer in an amount of from 30 to 80 weight percent, at least one hydrophilic monomer selected from HEMA, homologs of HEMA, and combinations thereof, in an amount of at least 30 to 80 weight percent, the hydrophilic monomer can be essentially free of an N-vinyl amide-containing hydrophilic monomer, and at least one primary amine-containing methacrylate monomer, or at least one primary amine-containing methacrylamide monomer can comprise at least one primary amine-containing methacrylate monomer, or at least one primary amine-containing methacrylamide monomer, or both at least one primary amine-containing methacrylate monomer and at least one primary amine-containing methacrylamide monomer. In yet another example, the polymerizable composition can comprise at least one hydroxyl-terminated siloxane monomer in an amount of from 20 to 80 weight percent, HEMA in an amount of at least 5 weight percent, at least one N-vinyl amine-containing hydrophilic monomer, in an amount of at least 20 to 80 weight percent, and at least one primary amine-containing methacrylamide monomer. In any of the foregoing examples, the polymerizable composition can be essentially free of an organic solvent or diluent, or can comprise less than 10 weight percent or an organic solvent or diluent.

In another example, the at least one siloxane monomer can comprise a siloxane monomer represented by formula (5):

siloxane)-poly(ω-methoxy-poly(ethylenegylcol)propylmethylsiloxane), which is a siloxane monomer of formula (5). The synthesis of this compound can be performed as described in US20090234089, which is incorporated herein by reference.

In yet another example, the at least one siloxane monomer can comprise a siloxane monomer represented by formula (6):

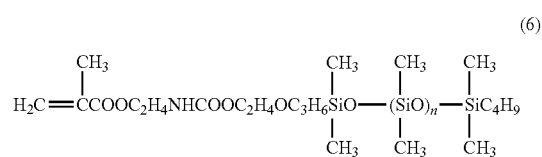

(6)

wherein n of formula (6) is an integer from 13-16, and the number average molecular weight is about 1500 daltons.

It has been found that the miscible polymerizable compositions disclosed herein can be particularly suited for use with lower molecular weight siloxane monomers, as the miscible polymerizable compositions polymerize to produce lens bodies having equilibrium water contents of at least 30%. The at least one lower molecular weight siloxane monomer can comprise at least one siloxane monomer having a number average molecular weight of less than 1,000 daltons. The at least one lower molecular weight siloxane monomer can comprise at least one siloxane monomer selected from the group consisting of: 3-[tris(trimethylsiloxy)silyl]propyl allyl carbamate, 3-[tris(trimethylsiloxy)silyl]propyl vinyl carbamate, trimethylsilylethyl vinyl carbonate, trimethylsilylmethyl vinyl carbonate, 3-[tris (trimethylsilyloxy) silyl]propyl methacrylate (TRIS), 3-methaycryloxy-2-hydroxypropyloxy) propylbis (trimethylsiloxy) methylsilane (SiGMA), methyldi (trimethylsiloxy) silylpropylglycerolethyl methacrylate (SiGEMA), monomethacryloxypropyl terminated polydimethylsiloxane (MCS-M11), any combination thereof. The at least one lower molecular weight siloxane monomer can comprise 3-[tris (trimethylsilyloxy)silyl]propyl methacrylate (TRIS). The at least one lower molecular weight siloxane monomer can comprise 3-methaycryloxy-2-hydroxypropyloxy) propylbis (trimethylsiloxy) methylsilane (SiGMA). In one example, the at least one lower molecular weight siloxane

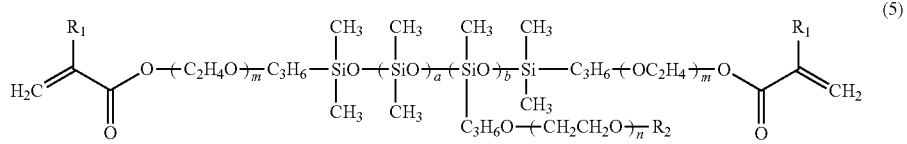

(5)

wherein $R_1$ of formula (5) is selected from either a hydrogen atom or a methyl group; $R_2$ of formula (5) is selected from either of hydrogen atom or a hydrocarbon group having 1 to 4 carbon atoms; m of formula (5) represents an integer of from 0 to 10; n of formula (5) represents an integer of from 4 to 100; a and b represent integers of 1 or more; a+b is equal to 20-500; b/(a+b) is equal to 0.01-0.22; and the configuration of siloxane units includes a random configuration.

SiO 2, one of the siloxane monomers used in the Examples, is α,ω-Bis(methacryloxypropyl)-poly(dimethyl-monomer can be present in the polymerizable composition in an amount of 20 to 50 weight percent, or of from 30 to 50 weight percent. In another example, when the at least one siloxane monomer is a lower molecular weight siloxane monomer, the at least one hydrophilic monomer can be at least one N-vinyl amide-containing hydrophilic monomer, and the at least one primary amine-containing methacrylate or primary amine-containing methacrylamide monomer can comprise at least one primary amine-containing methacrylamide monomer. In another example, the polymerizable composition can be free of DMA. In yet another example, the miscible polymerizable composition can be essentially free of an organic solvent or diluent, or can comprise less than 10 weight percent of an organic solvent or diluent.

Particular examples of lower molecular weight siloxane monomers include the siloxane monomers represented by formula (1) as described below. It has been found that lower molecular weight siloxane monomers having this general molecular structure are particularly compatible with the miscible polymerizable compositions of the present disclosure. In one example, the at least one lower molecular weight siloxane monomer of formula (1) can be present in the polymerizable composition in an amount of from 20 to 50 weight percent, or of from 30 to 50 weight percent. In another example, when the at least one siloxane monomer is a lower molecular weight siloxane monomer of formula (1), the at least one hydrophilic monomer can be at least one N-vinyl amide-containing hydrophilic monomer, and the at least one primary amine-containing methacrylate or primary amine-containing methacrylamide monomer can comprise at least one primary amine-containing methacrylamide monomer. In another example, the polymerizable composition can be free of DMA. In yet another example, the miscible polymerizable composition can be essentially free of an organic solvent or diluent, or can comprise less than 10 weight percent of an organic solvent or diluent.

The at least one lower molecular weight siloxane monomer can comprise a siloxane monomer represented by formula (1):

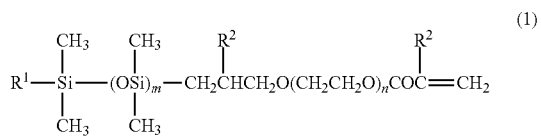

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane monomer having a number average molecular weight of from 400 daltons to 700 daltons.

The at least one lower molecular weight siloxane monomer can comprise a siloxane monomer represented by formula (1), wherein m of formula (1) represents one integer from 4 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane monomer having a number average molecular weight of from 400 daltons to 700 daltons.

The at least one lower molecular weight siloxane monomer can comprise a siloxane monomer represented by formula (1), wherein m of formula (1) is 4, n of formula (1) represents one integer from 1 to 10, $R^1$ of formula (1) is an alkyl group having 4 carbon atoms, one $R^2$ of formula (1) is a hydrogen atom and the other $R^2$ of formula (1) is a methyl group, the first siloxane monomer having a number average molecular weight of from 400 daltons to 700 daltons.

SiO 1, one of the siloxane monomers used in the Examples, is 2-propenoic acid, 2-methyl-, 2-[3-(9-butyl-1,1,3,3,5,5,7,7,9,9-decamethylpentasiloxane-1-yl)propoxy] ethyl ester (CAS number of 1052075-57-6), and was obtained from Shin-Etsu Chemical Co., Ltd., Tokyo, Japan, as product number X-22-1622. It is understood that SiO 1 is a siloxane monomer of formula (1) in accordance with any and all of the versions of formula (1) described herein.

The polymerizable compositions of the present disclosure optionally can comprise additional ingredients such as tinting agents, UV blocking agents, phosphine oxide-containing compounds, etc.

Tinting agents can include, for example, VAT Blue 6 (7,16-Dichloro-6,15-dihydroanthrazine-5,9,14,18-tetrone), or 1-Amino-4-[3-(beta-sulfatoethylsufonyl)anilio]-2-anthraquinonesulfonic acid (C. I. Reactive Blue 19, RB-19), or a monomer-dye compound of Reactive Blue 19 and hydroxyethylmethacrylate (RB-19-HEMA), or 1,4-bis[4-[(2-methacryl-oxyethyl)phenylamino]anthraquinone (Reactive Blue 246, RB-246, available from Arran Chemical Company, Athlone, Ireland), or 1,4-Bis[(2-hydroxyethyl)amino]-9,10-anthracenedione bis(2-propenoic)ester (RB-247), or Reactive Blue 4, RB-4, or a monomer-dye compound of Reactive Blue 4 and hydroxyethyl methacrylate (RB-4 HEMA or "Blue HEMA"), or any combination thereof. In one example, the tinting agent or tinting agent component can comprise a polymerizable tinting agent. The polymerizable tinting agent component can comprise, for example, RB-246, or RB-247, or RB-4 HEMA, or RB-19-HEMA, or any combination thereof. Examples of monomer-dye compounds include RB-4 HEMA and RB-19 HEMA. Additional examples of monomer-dye compounds are described in U.S. Pat. No. 5,944,853 and U.S. Pat. No. 7,216,975, both of which are incorporated in their entirety by reference herein.

UV blocking agents can include, for example, 2-(4-benzoyl-3-hydroxyphenoxy)ethyl acrylate, CAS number 16432-81-8, and 2-(3-(2H-benzotriazol-2-YL)-4-hydroxyphenyl) ethyl methacrylate (UV Bloc) CAS number 96478-09-0, used in some of the Example formulations disclosed herein.

Phosphine oxide-containing compounds can include, for example, triphenyl phosphine (TPP), CAS number 603-35-0, and diphenyl(P-vinylphenyl)phosphine (pTPP), CAS number 40538-11-2, used in some of the Example formulations disclosed herein.

The silicone hydrogel contact lens can be a primary amine-containing silicone hydrogel contact lens in which said complementary functional groups attached to said agent are covalently bonded to said plurality of primary amine functional groups of the polymeric lens body. As covalent bonds are present between the complementary functional groups of the agent and the plurality of primary amine groups of the polymeric lens body, the agent is thereby attached to the polymeric lens body. In one example, the complementary functional group attached to the agent can comprise an ester, and the plurality of primary amine functional groups of the polymeric lens body can be covalently bonded to the complementary functional groups attached to the agent through an amine-ester bond. In another example, the complementary functional group attached to the agent can comprise an aldehyde, and the plurality of primary amine functional groups of the polymeric lens body can be covalently bonded to the complementary functional groups attached to the agent through an amine-aldehyde bond. In another example, the complementary functional group attached to the agent can comprise a ketone, and the plurality of primary amine functional groups of the polymeric lens body can be covalently bonded to the complementary functional groups attached to the agent through an amine-ketone bond. In yet another example, the complementary functional group attached to the agent can comprise a carboxylic acid, and the plurality of primary amine functional groups of the polymeric lens body can be covalently bonded to the complementary functional groups attached to the agent through an amine-carboxylic acid bond. Additional examples of complementary functional groups known to form covalent bonds with amine functional groups are disclosed in U.S. Patent Application Publications US 2006/0105026, US 2007/0286891, and US 2009/0018575, each of which is incorporated herein by reference in its entirety.

One particular example of an ester functional group which can be used is an N-hydroxyl succinimide (NHS) group. In one example of the silicone hydrogel contact lens of the present disclosure, the agent can have an attached one or more NHS group, and the covalent bond formed between the primary amine functional groups and the complementary functional groups attached to the agent can be an amine-succinimide ester bonds.

The agent having the attached one or more of said complementary functional groups can be a pharmacologically active agent. For example, the pharmacologically active agent can be an anti-microbial agent, or an anti-allergy agent, or an agent to treat dry eye, or an agent to treat an ocular disease or condition such as glaucoma or macular degeneration, etc.

The agent having the attached one or more of said complementary functional groups can be a linking agent. As used herein, a linking agent is understood to be an agent having two or more complementary functional groups capable of bonding with or otherwise interacting with other functional groups in order to form a link between a first functional group which is part of the polymeric structure of the lens body, and a second functional group of a component which is not part of the polymeric lens body. For example, a linking agent may not itself be a wetting agent or a pharmacological agent, but may serve to bond or otherwise assist in attaching a pharmacological agent or a wetting agent to a lens body. For example, the linking agent can comprise two or more complementary functional groups, one of which can form a covalent amine bond with the lens body, and one of which can form a covalent bond, or an ionic bond, or a hydrogen bond, etc., with the pharmacological or wetting agent which is to be attached to the lens body.

The agent having the attached one or more of said complementary functional groups can be a wetting agent. As used herein, a wetting agent is understood to be an agent that can increase the wettability, or the lubricity, or the hydrophilicity, or any combination thereof, of a polymeric lens body. In one example, when a polymeric lens body alone does not have an ophthalmically acceptable wettability, covalently binding a wetting agent to the polymeric lens body through an amine bond can produce a modified polymeric lens body which has an ophthalmically acceptable wettability. In another example, where a polymeric lens body alone has a marginal or minimal level of wettability, covalently binding a wetting agent to the polymeric lens body through an amine bond can produce a modified polymeric lens body which has a higher level of wettability, and is more consistently wettable. In one example, the agent having the attached one or more of said complementary functional groups can be a wetting agent, and the silicone hydrogel contact lens having the attached agent can be contact lens having a contact angle of less than 70 degrees, or of less than 60 degrees, or of less than 50 degrees. For example, the contact angle can be from 0 to 69 degrees, or from 0 to 59 degrees, or from 0 to 49 degrees.

The contact angle can be a dynamic contact angle, or can be a static contact angle. The dynamic contact angle can be an advancing contact angle, or can be a receding contact angle. The contact angle can be determined using a routine method known to persons of ordinary skill in the art such as, for example, the sessile drop method or the captive bubble method.

The agent having the attached one or more of said complementary functional groups can be a polymeric agent having at least one attached complementary functional group. The polymeric agent can be a copolymer. The polymeric agent can be a homopolymer. The polymeric agent can be a linear polymer. The polymeric agent can be a branched polymer.

The agent having the attached one or more of said complementary functional groups can be a polymeric agent having at least one attached NHS functional groups. The agent having the at least one attached NHS functional group can be a NHS-derivatized vinyl pyrrolidone polymer, including a NHS-derivatized vinyl pyrrolidone homopolymer, or a NHS-derivitized vinyl pyrrolidone copolymer. The NHS-derivitized vinyl pyrrolidone copolymer can be a NHS-derivitized vinyl pyrrolidone-acrylic acid copolymer. Examples of NHS-derivitized polymers, including NHS-derivitized vinyl pyrrolidone-acrylic acid copolymers, are disclosed in US 2006/0105026, US 2007/0286891, and US 2009/0018575, each of which is incorporated herein by reference in its entirety.

The agent having the at least one attached NHS functional group can be a polymer having at least one NHS ester-containing functional group present in its structure. The at least one NHS ester-containing functional group present in the structure of the polymer can be provided by an acrylic acid NHS ester. Thus, the agent can comprise an acrylic acid NHS ester polymer, including an acrylic acid NHS ester homopolymer, or an acrylic acid NHS ester copolymer. The acrylic acid NHS ester copolymer can be a vinyl pyrrolidone-acrylic acid NHS ester copolymer. The acrylic acid NHS ester copolymer can be a vinyl pyrrolidone-acrylic acid-acrylic acid NHS ester terpolymer. Examples of NHS ester polymers, including vinyl pyrrolidone-acrylic acid NHS ester copolymers and vinyl pyrrolidone-acrylic acid-acrylic acid NHS ester terpolymers, are disclosed in US 2006/0105026, US 2007/0286891, and US 2009/0018575, each of which is incorporated herein by reference in its entirety.

In a particular example of the silicone hydrogel contact lens, the agent can be a polymeric wetting agent having at least one attached ester group. The agent can be a polymeric wetting agent having at least one attached NHS functional group. The silicone hydrogel contact lens having the attached polymeric wetting agent having an NHS functional group can have a contact angle of less than 70 degrees, for example, less than 60 degrees, or less than 50 degrees. The polymerizable composition used to form the polymeric lens body of the silicone hydrogel contact lens can comprise at least one N-vinyl amide-containing hydrophilic monomer, and the at least one primary amine-containing methacrylate or at least one primary amine-containing methacrylamide monomer can comprise at least one primary amine-containing methacrylamide monomer. The at least one primary amine-containing methacrylamide monomer can be at least one primary amine-containing methacrylamide monomer of formula (2) as described above. The at least one primary amine-containing methacrylamide monomer can be APMAA. The polymerizable composition can be free of DMA. The polymerizable composition can be essentially free of an organic solvent or diluent, or can comprise less than 10 weight percent of an organic solvent or diluent. The at least one siloxane monomer can be a lower molecular weight siloxane monomer, for example, a siloxane monomer having a molecular weight of less than 1,000 daltons, or a lower molecular weight siloxane monomer of formula (1) as described above.

In another particular example of the silicone hydrogel contact lens, where the agent is a polymeric wetting agent having at least one attached ester group, the polymerizable composition used to form the polymeric lens body of the silicone hydrogel contact lens can comprise HEMA, or at least one homolog of HEMA, and the at least one primary amine-containing methacrylate or primary amine-containing methacrylamide monomer can comprise at least one primary amine-containing methacrylate monomer, or at least one primary amine-containing methacrylamide monomer, or both. The agent can be a polymeric wetting agent having at least one attached NHS functional group. The silicone hydrogel contact lens having the attached polymeric wetting agent having an NHS functional group can have a contact angle of less than 70 degrees, for example, less than 60 degrees, or less than 50 degrees. The at least one primary amine-containing methacrylate monomer, or at least one primary amine-containing methacrylamide monomer, or both can be at least one primary amine-containing methacrylate monomer. The at least one primary amine-containing methacrylate monomer can be a primary amine-containing methacrylate monomer of formula (2) as described above. The at least one primary amine-containing methacrylate monomer can be AEMA. The polymerizable composition can be free of DMA. The polymerizable composition can be free of N-vinyl amide-containing hydrophilic monomers. The polymerizable composition can be essentially free of an organic solvent or diluent, or can comprise less than 10 weight percent of an organic solvent or diluent. The polymerizable composition can comprise at least 10 weight percent water as a diluent. The at least one siloxane monomer can be a hydroxyl-terminated siloxane monomer. The at least one siloxane monomer can be a HEMA-compatible siloxane monomer.

The agent having the attached one or more of said complementary functional groups can be a monomeric agent having at least one attached complementary functional group. For example, the polymeric lens body can be contacted by the monomeric agent so that the at least one attached complementary functional group of the monomeric agent forms an amine bond with the primary amine group of the polymeric lens body. The polymeric lens body with the attached monomeric agent can then be reacted in order to polymerize the monomeric agent with itself, or with a second monomer. The second monomer could be a wetting agent, or a pharmacological agent.

In an example where the agent comprises a monomeric agent, the method of manufacturing can further comprise a step of polymerizing the monomer which is present on at least a surface of the polymeric lens body. The monomeric agent can be polymerized prior to packaging the polymeric lens body in a contact lens package along with a contact lens packaging solution. Alternatively, the monomeric agent can be polymerized after packaging the polymeric lens body in a contact lens package along with a contact lens packaging solution. For example, the heat applied to the sealed contact lens package during the autoclaving process can cause thermal polymerization of the monomeric agent on at least a surface of the packaged polymeric lens body.

As previously stated, the present disclosure is also directed to a method of manufacturing the primary amine-containing silicone hydrogel contact lenses disclosed herein. The method of manufacturing a silicone hydrogel contact lens comprises: providing a miscible polymerizable composition, said polymerizable composition comprising (a) at least one siloxane monomer in an amount of from 20 to 80 weight percent; (b) at least one hydrophilic monomer in an amount of from 20 to 80 weight percent; (c) at least one cross-linking agent; (d) at least one polymerization initiator; and (e) at least one primary amine-containing methacrylate monomer or at least one primary amine-containing methacrylamide monomer. The method also comprises the step of polymerizing the polymerizable composition in a contact lens mold assembly to form a polymeric lens body having, when hydrated, an equilibrium water content of at least 30%, an oxygen permeability of at least 30 barrers, and a modulus of 0.3 to 1.2 MN; the polymeric lens body comprising a plurality of primary amine functional groups provided by polymerized units of the at least one primary amine-containing methacrylate monomer or the at least one primary amine-containing methacrylamide monomer. The method also comprises the steps of separating the polymeric lens body from the mold assembly; contacting the separated polymeric lens body with an aqueous solution comprising an agent having an attached one or more complementary functional groups, forming covalent bonds between the one or more complementary functional groups of the agent and the plurality of primary amine functional groups of the polymeric lens body, thereby attaching the agent to the contacted polymeric lens body; and packaging the contacted polymeric lens body in a contact lens packaging solution in a contact lens package to form a finished contact lens.

In one example, the method of manufacturing the silicone hydrogel contact lens can comprise a method wherein the separating the polymeric lens body from the mold assembly uses a mechanical demolding process which does not involve applying a liquid to the polymeric lens body or the mold assembly. In another example, the method of manufacturing the silicone hydrogel contact lens can comprise a method wherein the separating the polymeric lens body from the mold assembly uses a mechanical delensing process which does not involve applying a liquid to the polymeric lens body or a mold section. In yet another example, the method of manufacturing the silicone hydrogel contact lens can comprise a method wherein the separating the polymeric lens body from the mold assembly uses both a mechanical demolding process which does not involve applying a liquid to the polymeric lens body or the mold assembly, and a mechanical delensing process which does not involve applying a liquid to the polymeric lens body or a mold section.

In one example, the method of manufacturing the silicone hydrogel contact lens can comprise a method wherein the step of contacting the separated polymeric lens body with an aqueous solution comprising an agent is conducted at a temperature of from 20 to 60° C., or of from 20 to 40° C., or of from 20 to 30° C., or of from 20 to 25° C. In another example, the method of manufacturing the silicone hydrogel contact lens can comprise a method wherein the step of contacting the separated polymeric lens body with an aqueous solution comprising an agent is conducted at a pH of from 5.0 to 9.0. The pH can be from 6.0 to 8.0, or from 6.5 to 7.5, or can be about 7. In yet another example, the method of manufacturing the silicone hydrogel contact lens can comprise a method wherein the step of contacting the separated polymeric lens body with an aqueous solution comprising an agent is conducted at a temperature of from 20 to 60° C., or of from 20 to 40° C., or of from 20 to 30° C., or of from 20 to 25° C. and at a pH of from 5.0 to 9.0, or from 6.0 to 8.0, or from 6.5 to 7.5, or at a pH of about 7.

The method of manufacturing the silicone hydrogel contact lens can further comprise a step of extracting the polymeric lens body. The step of extracting can be effective to remove unreacted monomer from the polymeric lens body. This step can be particularly important for silicone hydrogel contact lenses, as the unreacted monomer(s) which may be present in the polymeric lens body following polymerization can be toxic. Depending upon the ingredients used in the polymerizable composition and the conditions under which polymerization occurs, these toxic monomers can be present in the polymeric lens body in sufficient quantities that the polymeric lens body needs to be extracted before it is suitable for use in the eye. Extraction of the polymeric lens body serves to remove at least a portion of the unreacted monomers from the polymeric lens body, making it suitable for use in the eye.

Optionally, the method of manufacturing disclosed herein can further comprise an extraction step. In one example, the polymeric lens body which is extracted in the extraction step can comprise a separated polymeric lens body (i.e., a polymeric lens body which has been demolded and delensed prior to being extracted). The method of manufacturing the silicone hydrogel contact lens can further comprise a step of extracting the separated polymeric lens body. In another example, the polymeric lens body which is extracted in the extraction step can comprise a contacted polymeric lens body (i.e., a polymeric lens body which has been demolded and delensed and which has then been contacted prior to being extracted). The method of manufacturing can further comprise a step of extracting the contacted polymeric lens body. In yet another example, the method of manufacturing can further comprise a step of extracting the separated polymeric lens body and the contacted polymeric lens body. The extracting can be done using an extraction media essentially free of an organic solvent, or can be done using an extraction media comprising an organic solvent such as, for example, an alcohol, depending upon the hydrophilicity, toxicity and amount of unreacted monomer present which is present in the polymeric lens body before extraction. When the unreacted monomer(s) are highly soluble in the aqueous solution comprising the contacting agent, the aqueous solution comprising the contacting agent can serve as an extraction media, and the contacting step can serve as an extraction step.

In one particular example of the method of manufacturing a silicone hydrogel contact lens of the present disclosure, when the step of extracting the polymeric lens body to remove unreacted monomer comprises using an extraction media essentially free of an organic solvent, the polymerizable composition used to form the polymeric lens body of the silicone hydrogel contact lens can comprise at least one N-vinyl amide-containing hydrophilic monomer, and the at least one primary amine-containing methacrylate or primary amine-containing methacrylamide monomer can comprise a primary amine-containing methacrylamide monomer. The at least one primary amine-containing methacrylamide monomer can be a primary amine-containing methacrylamide monomer of formula (2) as described above. The at least one primary amine-containing methacrylamide monomer can be APMAA. The polymerizable composition can be free of DMA. The polymerizable composition can be essentially free of an organic solvent or diluent, or can comprise less than 10 weight percent of an organic solvent or diluent. The at least one siloxane monomer can be a lower molecular weight siloxane monomer, for example, a siloxane monomer having a number average molecular weight of less than 1,000 daltons, or a lower molecular weight siloxane monomer of formula (1) as described above. The step of contacting the separated polymeric lens body with an aqueous solution comprising an agent can be conducted at a temperature of from 20 to 60° C., or at a pH of from 5.0 to 9.0, or at both a temperature of from 20 to 60° C. and at a pH of from 5.0 to 9.0.

In another particular example of the method of manufacturing a silicone hydrogel contact lens of the present disclosure, when the step of extracting the polymeric lens body to remove unreacted monomer comprises using an extraction media essentially free of an organic solvent, the polymerizable composition used to form the polymeric lens body of the silicone hydrogel contact lens can comprise HEMA, or at least one homolog of HEMA, and the at least one primary amine-containing methacrylate or primary amine-containing methacrylamide monomer can comprise at least one primary amine-containing methacrylate monomer, or at least one primary amine-containing methacrylamide monomer, or both. The at least one primary amine-containing methacrylate monomer, or at least one primary amine-containing methacrylamide monomer, or both can be at least one primary amine-containing methacrylate monomer. The at least one primary amine-containing methacrylate monomer can be a primary amine-containing methacrylate monomer of formula (2) as described above. The at least one primary amine-containing methacrylate monomer can be AEMA. The polymerizable composition can be free of DMA. The polymerizable composition can be free of N-vinyl amide-containing hydrophilic monomers. The polymerizable composition can be essentially free of an organic solvent or diluent, or can comprise less than 10 weight percent of an organic solvent or diluent. The polymerizable composition can comprise at least 10 weight percent water as a diluent. The at least one siloxane monomer can be a hydroxyl-terminated siloxane monomer. The at least one siloxane monomer can be a HEMA-compatible siloxane monomer. The step of contacting the separated polymeric lens body with an aqueous solution comprising an agent can be conducted at a temperature of from 20 to 60° C., or at a pH of from 5.0 to 9.0, or at both a temperature of from 20 to 60° C. and at a pH of from 5.0 to 9.0.

The method of manufacturing the silicone hydrogel contact lens of the present disclosure can further comprise a step of washing the contacted polymeric lens body prior to the packaging. In one example, the washing step can be effective to remove excess agent from the polymeric lens body which did not covalently bond to the lens body during the contacting step. In another example, the washing step can be effective to neutralize the pH if the contacting step is conducted at a pH other than neutral pH. In yet another example, the washing step can be effective to both remove excess agent from the polymeric lens body which did not covalently bond to the lens body during the contacting step, and to neutralize the pH if the contacting step is conducted at a pH other than neutral pH.

In one particular example, the method of manufacturing the silicone hydrogel contact lens can be a method wherein the finished contact lens has a contact angle at least 10 degrees lower than a contact angle of a contact lens made using the same polymerizable composition and using the same method of manufacture except without the step of contacting the separated polymeric lens body with the aqueous solution of the agent. The agent used during the contacting step can be a wetting agent. The agent used during the contacting step can be a wetting agent having an attached at least ester functional group, or at least one aldehyde functional group, or at least one ketone functional group, or at least one carboxylic acid functional group. The agent used during the contacting step can be a wetting agent having an attached at least one ester functional group. The agent can be a wetting agent having an attached at least one NHS group. The agent can be a polymeric wetting having an attached at least one NHS group. The polymerizable composition used to form the polymeric lens body of the method can comprise at least one N-vinyl amide-containing hydrophilic monomer, and the at least one primary amine-containing methacrylate or primary amine-containing methacrylamide monomer can comprise a primary amine-containing methacrylamide monomer. The at least one primary amine-containing methacrylamide monomer can be a primary amine-containing methacrylamide monomer of formula (2) as described above. The at least one primary amine-containing methacrylamide monomer can be APMAA. The polymerizable composition can be free of DMA. The polymerizable composition can be essentially free of an organic solvent or diluent, or can comprise less than 10 weight percent of an organic solvent or diluent. The at least one siloxane monomer can be a lower molecular weight siloxane monomer, for example, a siloxane monomer having a molecular weight of less than 1,000 daltons, or a lower molecular weight siloxane monomer of formula (1) as described above.

In another particular example where the method of manufacturing the silicone hydrogel contact lens is a method wherein the finished contact lens has a contact angle at least 10 degrees lower than a contact angle of a contact lens made using the same polymerizable composition and using the same method of manufacture except without the step of contacting the separated polymeric lens body with the aqueous solution of the wetting agent, the polymerizable composition used to form the polymeric lens body of the silicone hydrogel contact lens can comprise HEMA, or at least one homolog of HEMA, and the at least one primary amine-containing methacrylate or primary amine-containing methacrylamide monomer can comprise at least one primary amine-containing methacrylate monomer, or at least one primary amine-containing methacrylamide monomer, or both. The at least one primary amine-containing methacrylate monomer, or at least one primary amine-containing methacrylamide monomer, or both can be at least one primary amine-containing methacrylate monomer. The at least one primary amine-containing methacrylate monomer can be a primary amine-containing methacrylate monomer of formula (2) as described above. The at least one primary amine-containing methacrylate monomer can be AEMA. The polymerizable composition can be free of DMA. The polymerizable composition can be free of N-vinyl amide-containing hydrophilic monomers. The polymerizable composition can be essentially free of an organic solvent or diluent, or can comprise less than 10 weight percent of an organic solvent or diluent. The polymerizable composition can comprise at least 10 weight percent water as a diluent. The at least one siloxane monomer can be a hydroxyl-terminated siloxane monomer. The at least one siloxane monomer can be a HEMA-compatible siloxane monomer. The agent used during the contacting step can be a wetting agent having an attached at least ester functional group, or at least one aldehyde functional group, or at least one ketone functional group, or at least one carboxylic acid functional group. The agent used during the contacting step can be a wetting agent having an attached at least one ester functional group. The agent can be a wetting agent having an attached at least one NHS group. The agent can be a polymeric wetting having an attached at least on NHS group.

Unless stated otherwise, any weight percent (wt %) provided herein is based on the total weight of the composition.

EXAMPLES

The following Examples illustrate certain aspects and advantages of the present invention, which should be understood not to be limited thereby.

Silicone Hydrogel Contact Lens Fabrication and Testing Procedure

The chemical compounds set forth in Examples were, for each example, weighed out in amounts corresponding to the described weight percentages and combined to form a mixture. The mixture was filtered through a 0.2-5.0 micron syringe filter into a bottle. Mixtures were stored for up to about 2 weeks. The mixtures are understood to be polymerizable silicone hydrogel contact lens precursor compositions, or as used herein, polymerizable compositions.

A volume of the polymerizable composition was cast molded by placing the composition in contact with a lens defining surface of a female mold member. A male mold member was then placed in contact with the female mold member to form a contact lens mold assembly comprising a contact lens shaped cavity containing the polymerizable composition. In all of the following Examples, the molding surfaces of both the female and male mold members were formed of a non-polar resin, specifically polypropylene, by injection molding, although polar resins could also be used.

The filled contact lens mold assemblies were placed in an oven with an air atmosphere to thermally react the polymerizable compositions, although a nitrogen flushed oven could have been used. For all of the Examples, the contact lens mold assemblies were exposed to temperatures of at least about 55° C. for about 2 hours. Examples of curing profiles which can be used to cure silicone hydrogel contact lenses described herein include exposing the contact lens mold assemblies to temperatures of 55° C. for 40 minutes, 80° C. for 40 minutes, and 100° C. for 40 minutes. Other contact lenses can be made with the same curing profile, but instead of the first temperature being at 55° C., it can be at 65° C.

After polymerizing the polymerizable compositions to form the polymeric lens bodies, the contact lens mold assemblies were demolded to separate the male and female mold members using a dry mechanical demolding process. Following the demolding, the polymerized contact lens body remained adhered to the male mold or the female mold. The polymerized contact lens body was then delensed from the male mold to produce a delensed polymerized contact lens body using a dry mechanical delensing process, although a "float-off" delensing process, which involves soaking the demolded lenses in water or an aqueous solution until they release from the male molds, could be used as well.

The delensed polymeric lens bodies of the Examples were placed individually in separate contact lens blister containers with 2 ml of deionized water for 15 minutes to extract, wash and hydrate the lens bodies, although other volumes of water, other aqueous media, and other durations of time could be used. Next, the deionized water was removed, and a phosphate buffered saline solution was added to the blister package, and the blister package was sealed and autoclaved. The polymeric lens bodies of the Examples were not contacted with an agent, but the step of contacting the lens bodies with the agent could be done before an extraction step, or after an extraction step, or before a washing step, or after a washing step, or the agent could be present in the packaging solution, or any combination thereof.

For the lenses of Example 3, following sterilization, lens properties including modulus, elongation, tensile strength, equilibrium water content, wet extractables, ionoflux, and contact angle were determined, using the methods described below.

The equilibrium water content (EWC) was determined using the following method: a hydrated silicone hydrogel contact lens was removed from an aqueous liquid, wiped to remove excess surface water, and weighed. The weighed lens was then dried in an oven at 80 degrees C. under a vacuum, and the dried lens was then weighed. The weight difference was determined by subtracting the weight of the dry lens from the weight of the hydrated lens. The water content (%) is the (weight difference/hydrated weight)×100.

The oxygen permeability (Dk) of the lenses of the Examples was determined using the Mocon Method, as described in U.S. Pat. No. 5,817,924, which is incorporated by reference herein. The Dk values were determined using a commercially available instrument under the model designation of MOCON® Ox-Tran System (Mocon Inc., Minneapolis, Minn., USA), and are reported as Dk/t.

The advancing and receding contact angles were determined using a Kruss DSA 100 instrument (Kruss GmbH, Hamburg), and as described in D. A. Brandreth: "Dynamic contact angles and contact angle hysteresis", Journal of Colloid and Interface Science, vol. 62, 1977, pp. 205-212 and R. Knapikowski, M. Kudra: Kontaktwinkelmessungen nach dem Wilhelmy-Prinzip-Ein statistischer Ansatz zur Fehierbeurteilung", Chem. Technik, vol. 45, 1993, pp. 179-185, and U.S. Pat. No. 6,436,481, all of which are incorporated by reference herein.

As an example, the advancing contact angle and receding contact angle were determined using a captive bubble method using phosphate buffered saline (PBS; pH=7.2). The lens was flattened onto a quartz surface and rehydrated with PBS for at least 10 minutes before testing. An air bubble was placed onto a lens surface using an automated syringe system. The size of the air bubble was increased and decreased to obtain the receding angle (the plateau obtained when increasing the bubble size) and the advancing angle (the plateau obtained when decreasing the bubble size).

The modulus, elongation, and tensile strength values were determined using test methods in accordance with ANSI Z80.20. The modulus, elongation, and tensile strength values reported herein were determined by using an Instron Model 3342 or 3343 mechanical testing system (Instron Corporation, Norwood, Mass., USA) and Bluehill Materials Testing Software, using a custom built rectangular contact lens cutting die to prepare the rectangular sample strip. The modulus, elongation and tensile strength were determined inside a chamber having a relative humidity of least 70%. The lens to be tested was soaked in phosphate buffered solution (PBS) for at least 10 minutes prior to testing. While holding the lens concave side up, a central strip of the lens was cut using the cutting die. The thickness of the strip was determined using a calibrated gauge (Rehder electronic thickness gauge, Rehder Development Company, Castro Valley, Calif., USA). Using tweezers, the strip was loaded into the grips of the calibrated Instron apparatus, with the strip fitting over at least 75% of the grip surface of each grip. A test method designed to determine the maximum load (N), the tensile strength (MPa), the strain at maximum load (% elongation) and the mean and standard deviation of the tensile modulus (MPa) was run, and the results were recorded.

The percentage of the wet extractable component component was determined by extracting the lenses in methanol using a Sohxlet extraction process. For determination of the wet extractable component, a sample of 5 fully hydrated and sterilized contact lenses was prepared by removing excess packaging solution from each lens and drying them overnight in an 80° C. vacuum oven. When dried and cooled, each lens was weighed to determine its initial dry weight (W1). Each lens was then placed in a perforated, stackable Teflon thimble, and the thimbles were stacked to form an extraction column with an empty thimble placed at the top of the column. The extraction column was placed into a small Sohxlet extractor attached to a condenser and a round bottom flask containing 70-80 ml methanol. Water was circulated through the condenser and the methanol was heated until it gently boiled. The lenses were extracted for at least 4 hours from the time condensed methanol first appeared. The extracted lenses were again dried overnight at 80° C. in a vacuum oven. When dried and cooled, each lens was weighed to obtain the dry weight of the extracted lens (W2), and the following calculation was made for each lens to determine the percent wet extractables: $[(W1-W2)/W1] \times 100$.

For the lenses of the following Examples, the ionoflux was measured using a technique substantially similar to the "Ionoflux Technique" described in U.S. Pat. No. 5,849,811, which is incorporated by reference herein. Prior to measurement, a hydrated lens was equilibrated in deionized water for at least 10 minutes. The lens to be measured was placed in a lens-retaining device, between male and female portions. The male and female portions included flexible sealing rings which were positioned between the lens and the respective male or female portion. After positioning the lens in the lens-retaining device, the lens-retaining device was then placed in a threaded lid. The lid was screwed onto a glass tube to define a donor chamber. The donor chamber was filled with 16 ml of 0.1 molar NaCl solution. A receiving chamber was filled with 80 ml of deionized water. Leads of the conductivity meter were immersed in the deionized water of the receiving chamber and a stir bar was added to the receiving chamber. The receiving chamber was placed in a water bath and the temperature was held at about 35° C. Finally, the donor chamber was immersed in the receiving chamber such that the NaCl solution inside the donor chamber was level with the water inside the receiving chamber. Once the temperature inside the receiving chamber was equilibrated to 35° C., measurements of conductivity were taken every 2 minutes for at least 10 minutes. The conductivity versus time data was substantially linear, and was used to calculate the ionoflux value for the lenses tested.

Comparative Example 1

Polymerizable compositions 3A and 5A were prepared using the chemical compounds in the specified amounts listed in the table below, and used to prepare contact lenses, in accordance with the procedures described in the Silicone Hydrogel Contact Lens Fabrication and Testing Procedure given above.

TABLE 1

| | Formulation # | |
|---|---|---|
| Ingredient | 3A (wt. %) | 5A (wt. %) |
| SiO 1 | 24.30 | 24.7 |
| HEMA | 22.30 | 19.8 |

TABLE 1-continued

| | Formulation # | |
|---|---|---|
| Ingredient | 3A (wt. %) | 5A (wt. %) |
| NVP | 48.50 | 0 |
| VMA | 0 | 29.7 |
| EGDMA | 0.10 | 0.10 |
| DEGVE | 0 | 14.8 |
| AMA | 0.24 | 0.25 |
| pTPP | 0.48 | 0.49 |
| VAZO-64 | 0.48 | 0.49 |
| UV Bloc | 1.65 | 1.68 |
| AEMA free base | 1.94 | 0.99 |
| Polymerizable composition appearance | Hazy, phase separated | Clear |
| Dry lens appearance | Yellow | Yellow, not fully cured |

Both polymerizable compositions of Example 1 contain N-vinyl amide-containing monomers (VMA or NVP). The use of the primary amine-containing methacrylate monomer AEMA in these polymerizable compositions resulted yellow-colored lenses which were not ophthalmically acceptable.

Example 1

Polymerizable compositions P1 and P2 were prepared using the chemical compounds in the specified amounts listed in the table below, and used to prepare contact lenses, in accordance with the procedures described in the Silicone Hydrogel Contact Lens Fabrication and Testing Procedure given above.

TABLE 2

| | Formulation # | |
|---|---|---|
| Ingredient | P1 (wt. %) | P2 (wt. %) |
| SiO 1 | 19.25 | 0 |
| SiO 2 | 0 | 19.25 |
| SiGMA | 29.62 | 29.62 |
| DMA | 47.49 | 47.49 |
| TEGDMA | 0.82 | 0.82 |
| TPP | 0.51 | 0.51 |
| VAZO-64 | 0.31 | 0.31 |
| AEMAA free base | 2.0 | 2.0 |
| Dry lens appearance | Clear, not yellow | Cloudy |

Both polymerizable compositions of Example 1 contain less than 10 weight percent of an organic solvent or diluent, included at least one hydrophilic monomer (DMA) in an amount greater than 30 weight percent, and included a single primary amine-containing methacrylamide monomer. Both polymerizable compositions also included two siloxane monomers as the at least one siloxane monomer of the polymerizable composition, with SiGMA being present as the second siloxane monomer in both polymerizable compositions. The polymerizable composition with SiO 1, a lower molecular weight siloxane monomer and a siloxane monomer of formula (1) as the first siloxane monomer produced an ophthalmically acceptably clear polymer lens body free of unwanted color. However, the polymerizable composition with SiO 2, a higher molecular weight siloxane monomer, and a siloxane monomer of formula (5), produced a cloudy polymeric lens body, which would not be acceptable for use as a contact lens. This Example shows, at least for polymerizable compositions comprising SiGMA as the second siloxane at levels above 20 wt. % and/or DMA as the at least one hydrophilic monomer, that, when the first siloxane monomer is present in an amount of 15 wt. % or more, lower molecular weight siloxanes, particularly lower molecular weight siloxanes of formula (1), are more compatible with the polymerizable compositions comprising at least one primary amine-containing methacrylate monomer or at least one primary amine-containing methacrylamide monomer of the present disclosure.

Example 2

Polymerizable compositions C1 and C2 were prepared using the chemical compounds in the specified amounts listed in the table below, and used to prepare contact lenses, in accordance with the procedures described in the Silicone Hydrogel Contact Lens Fabrication and Testing Procedure given above.

TABLE 3

| | Formulation # | |
|---|---|---|
| Ingredient | C1 (wt. %) | C2 (wt. %) |
| SiO 3 | 31 | 31 |
| HEMA | 45 | 45 |
| MA | 1.4 | 1.4 |
| TEGDMA | 0.4 | 0.4 |
| VAZO-52 | 0.4 | 0.4 |
| AEMA HCl salt | 1.6 | 0 |
| AEMAA HCl salt | 0 | 1.6 |
| DI water (diluent) | 20 | 20 |
| Dry lens appearance | Clear, not yellow | Clear, not yellow |

Both polymerizable compositions comprise SiO 3 as the at least one siloxane monomer, a siloxane monomer which is hydroxyl-terminated and which is also HEMA-compatible, in an amount greater than 30 weight percent. Both polymerizable compositions also comprise HEMA as a portion of the at least one hydrophilic monomer, in an amount greater than 30 weight percent. Both polymerizable compositions are also free of an N-vinyl amide-containing hydrophilic monomer, contain at least 10 wt. % of water as a diluent, and contain less than 10 wt. % of an organic solvent or organic diluent. For both these polymerizable compositions, the salt form of the primary amine-containing methacrylate monomer or the primary amine-containing methacrylamide monomer was used, as it was soluble in the polymerizable composition due to the presence of the deionized water diluent. Use of either a primary amine-containing methacrylate monomer or a primary amine-containing methacrylamide monomer in these polymerizable compositions yielded ophthalmically acceptably clear polymer lens bodies free of unwanted color.

Example 3

Polymerizable compositions 7A, 7B, 8A and 8B were prepared using the chemical compounds in the specified amounts listed in the table below, used to prepare contact lenses, and the contact lenses were tested in accordance with the procedures described in the Silicone Hydrogel Contact Lens Fabrication and Testing Procedure given above.

TABLE 4

| Ingredient | 7A (wt. %) | 7B (wt. %) | 8A (wt. %) | 8B (wt. %) |
|---|---|---|---|---|
| SiO 1 | 27 | 27 | 28 | 28 |
| HEMA | 15 | 18 | 24 | 10 |

TABLE 4-continued

| Ingredient | 7A (wt. %) | 7B (wt. %) | 8A (wt. %) | 8B (wt. %) |
|---|---|---|---|---|
| VMA | 35 | 31 | 0 | 0 |
| NVP | 0 | 0 | 41 | 41 |
| HOB | 17 | 0 | 0 | 0 |
| HOP | 0 | 18 | 0 | 14 |
| EGDMA | 0.1 | 0.05 | 0.1 | 0.1 |
| AMA | 0.2 | 0.34 | 0.3 | 0.3 |
| pTPP | 0.5 | 0.05 | 0.9 | 0.9 |
| UV Bloc | 1.7 | 1.7 | 1.6 | 1.6 |
| VAZO-64 | 1.9 | 2.0 | 1.9 | 1.9 |
| RB19-HEMA | 0.02 | 0.02 | 0.02 | 0.02 |
| APMAA free base | 1.5 | 1.5 | 1.4 | 1.4 |

All four of the polymerizable compositions of Example 3 comprise an N-vinyl amide-containing hydrophilic monomer (specifically NVP or VMA) as one component of the at least one hydrophilic monomer, and the N-vinyl amide-containing hydrophilic monomer is present in an amount of at least 30 weight percent. All four of the polymerizable compositions also comprise HEMA as a component of the at least one hydrophilic monomer, and the HEMA is present in an amount of at least 10 weight percent. All four of the polymerizable compositions contain less than 10 weight percent of an organic solvent or organic diluent. All four of the polymerizable compositions include a cross-linking agent having at least one vinyl polymerizable group and at least one methacrylate polymerizable group as a component of the at least one cross-linking agent. All four of the polymerizable compositions include SiO 1 as the at least one siloxane monomer. SiO 1 is a lower molecular weight siloxane monomer. SiO 1 is also a siloxane monomer of formula (1). In all four of the polymerizable compositions, the at least one siloxane monomer is present in an amount of at least 25 weight percent. The at least one primary amine-containing methacrylate monomer or at least one primary amine-containing methacrylamide monomer of these four polymerizable compositions is a primary amine-containing methacrylamide monomer, and the primary amine-containing methacrylamide monomer is present in an amount greater than 1.0 weight percent. Additionally, the primary amine-containing methacrylamide monomer is an alkane chain-containing primary amine-containing methacrylamide monomer having an alkane chain which is from 2 to 6 carbons in length.

TABLE 5

| Lens Property | 7A | 7B | 8A | 8B |
|---|---|---|---|---|
| Can mechanically dry demold? | Yes | Yes | Yes | Yes |
| Can mechanically dry delens? | Yes | Yes | Yes | Yes |
| Dry lens appearance | Clear, not yellow | Clear, not yellow | Clear, not yellow | Clear, not yellow |
| Equilibrium Water Content (%) | — | 48.84 ± 0.51 | 49.62 ± 0.58 | — |
| Modulus (MPa) | — | 0.62 ± 0.04 | 0.47 ± 0.03 | — |
| Elongation (%) | — | 325 ± 87 | 354 ± 4 | — |
| Tensile Strength (MPa) | — | 1.11 ± 0.48 | 1.41 ± 0.16 | — |
| Wet Extractables (%) | — | 4.42 ± 0.39 | 4.45 ± 0.30 | — |
| Ionoflux ($\times 10^{-3}$ mm$^2$/min) | — | 3.36 ± 0..49 | 3.97 ± 0.15 | — |
| Oxygen Permeability (Dk/t) (barrers) | — | 39.7 ± 0.9 | 41.3 ± 1.9 | — |
| Advancing Contact Angle of polymeric lens body without agent (°) | — | 96.1 ± 0.4 | 91.3 ± 2.1 | — |

All the polymeric lens bodies produced using the polymerizable compositions of Example 3 could be demolded and delensed using dry mechanical processes to yield ophthalmically acceptably clear polymer lens bodies free of unwanted color. The polymeric lens bodies of polymerizable compositions 7B and 8A had equilibrium water contents of at least 40%, moduli of 0.4 to 0.7 MPa, and oxygen permeability of at least 35 barrers. The advancing contact angles of the hydrated lens bodies were greater than 90°. The lens bodies of Example 3 were not contacted by an agent having an attached at least one complementary functional group.

Although the disclosure herein refers to certain illustrated embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the additional disclosure.

A number of publications and patents have been cited hereinabove. Each of the cited publications and patents are hereby incorporated by reference in their entireties.

The invention in an illustrative embodiment provides a silicone hydrogel contact lens, comprising a polymeric lens body having, when hydrated, an equilibrium water content of at least 30%, an oxygen permeability of at least 30 barrers, and a modulus of 0.3 to 1.2 MPa, and which is the reaction product of a miscible polymerizable composition, said miscible polymerizable composition comprising
   (a) at least one siloxane monomer;
   (b) at least one hydrophilic monomer;
   (c) at least one cross-linking agent;
   (d) at least one polymerization initiator; and
   (e) at least one primary amine-containing methacrylate monomer or at least one primary amine-containing methacrylamide monomer;

wherein the polymeric lens body comprises a plurality of primary amine functional groups provided by polymerized units of the at least one primary amine-containing methacrylate monomer or polymerized units of the at least one primary amine-containing methacrylamide monomer, and the plurality of primary amine functional groups form covalent bonds with complementary functional groups when the polymeric lens body is provided in an aqueous solution comprising an agent having an attached one or more of said complementary functional groups; and a method of manufacturing said lens comprising providing a said polymerizable composition. The at least one siloxane monomer and the at least one hydrophilic monomer may each be present in the polymerizable composition in an amount of at least 20 weight percent. The at least one siloxane monomer may for example be present in an amount of from 20 to 80 weight percent and the at least one hydrophilic monomer may be present in an amount of from 20 to 80 weight percent, in each case based on the total amount of siloxane monomer(s) and hydrophilic monomer(s). The at least one primary amine-containing methacrylate monomer or at least one primary amine-containing methacrylamide monomer may for example be present in an amount of at least 0.2 weight percent, for example from 0.2 to 20.0 weight percent, or 1.0 to 5.0 weight percent based on the total weight of the polymerizable composition. The polymerization composition further comprises an effective amount of at least one cross-linking agent and an effective amount of at least one polymerization initiator. An organic solvent or diluent may if desired, or if necessary to achieve a miscible composition, be present in the polymerizable composition in an amount of up to 30.0 weight percent. In the above-mentioned illustrative embodiment the lens or method may further include the feature(s) of any one or more of the dependent claims herein.

The invention claimed is:
1. A silicone hydrogel contact lens, comprising:
    a polymeric lens body having, when hydrated, an equilibrium water content of at least 30%, an oxygen permeability of at least 30 barrers, and a modulus of 0.3 to 1.2 MPa, and which is the reaction product of a miscible polymerizable composition, said miscible polymerizable composition comprising
        (a) at least one siloxane monomer in an amount of from 20 to 80 weight percent;
        (b) at least one hydrophilic monomer in an amount of from 20 to 80 weight percent;
        (c) at least one cross-linking agent;
        (d) at least one polymerization initiator; and
        (e) at least one primary amine-containing methacrylate monomer or at least one primary amine-containing methacrylamide monomer;
    wherein the polymeric lens body comprises a plurality of primary amine functional groups provided by polymerized units of the at least one primary amine-containing methacrylate monomer or polymerized units of the at least one primary amine-containing methacrylamide monomer, and the plurality of primary amine functional groups are covalently bonded with complementary functional groups as a result of the polymeric lens body having been provided in an aqueous solution comprising an agent having an attached one or more of said complementary functional groups.
2. The contact lens of claim 1, wherein the at least one primary amine-containing methacrylate monomer or the at least one primary amine-containing methacrylamide monomer is present in free base form.

3. The contact lens of claim 1, wherein the at least one primary amine-containing methacrylate monomer or the at least one primary amine-containing methacrylamide monomer is present in the polymerizable composition in an amount of at least 0.2 weight percent.
4. The contact lens of claims 1, wherein the at least one primary amine-containing methacrylate monomer or the at least one primary amine-containing methacrylamide monomer is an alkane chain-containing primary amine-containing methacrylamide monomer, and wherein the alkane chain is from 2 to 8 carbons in length.
5. The contact lens of claim 1, wherein the miscible polymerizable composition is free of an organic solvent or organic diluent.
6. The contact lens of claims 1, wherein the at least one hydrophilic monomer comprises an N-vinyl amide-containing hydrophilic monomer.
7. The contact lens of claim 6, wherein the at least one primary amine-containing methacrylate monomer or the at least one primary amine-containing methacrylamide monomer is at least one primary amine-containing methacrylamide monomer, and is selected from the group consisting from a form of N-(2-Amino-ethyl)methacrylamide (AEMAA) monomer, a form of N-(3-Amino-propyl)methacrylamide (APMAA) monomer, and any combination thereof.
8. The contact lens of claims 1, wherein the at least one siloxane monomer is selected from the group consisting of: a silicon-containing vinyl carbonate monomer, a silicon-containing vinyl carbamate monomer, a monomethacryloxypropyl terminated polydimethylsiloxane monomer, a monomethacryloxypropyl terminated mono-n-butyl terminated polydimethyl siloxane monomer, and any combination thereof.
9. The contact lens of claim 1, wherein the at least one siloxane monomer comprises a siloxane monomer represented by formula (1):

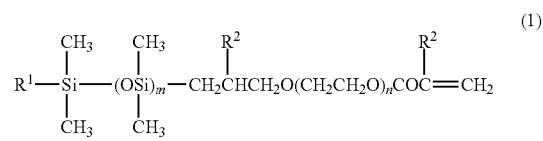

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group.
10. The contact lens of claim 1, wherein said complementary functional group of said agent comprises an ester, an aldehyde, a ketone, or a carboxylic acid functional group; the plurality of primary amine functional groups of the polymeric lens body are covalently bonded to the complementary functional groups attached to the agent through an amine-ester, an amine-aldehyde, an amine-ketone, or an amine-carboxylic acid bond, respectively; and the agent is thereby attached to the polymeric lens body.
11. The contact lens of claim 10, wherein the complementary functional group of the agent is an N-hydroxyl succinimide (NHS) group, and the covalent bond is an amine-succinimide ester bond.
12. The contact lens of claim 10, wherein the agent is a wetting agent or a linking agent.

13. The contact lens of claim 10, wherein the agent comprises a polymer having at least one attached complementary functional group.

14. The contact lens of claim 10, wherein the agent is a wetting agent, and the polymeric lens body has a contact angle of less than 70 degrees.

15. The contact lens of claim 1, wherein the at least one primary amine-containing methacrylate monomer or the at least one primary amine-containing methacrylamide monomer is a) present in free base form, b) an alkane chain-containing primary amine-containing methacrylamide monomer, and wherein the alkane chain is from 2 to 8 carbons in length, and wherein the miscible polymerizable composition is free of an organic solvent or organic diluent.

16. A method of manufacturing a silicone hydrogel contact lens, comprising:
providing a miscible polymerizable composition, said polymerizable composition comprising
(a) at least one siloxane monomer in an amount of from 20 to 80 weight percent;
(b) at least one hydrophilic monomer in an amount of from 20 to 80 weight percent;
(c) at least one cross-linking agent;
(d) at least one polymerization initiator; and
(e) at least one primary amine-containing methacrylate monomer or at least one primary amine-containing methacrylamide monomer;
polymerizing the polymerizable composition in a contact lens mold assembly to form a polymeric lens body having, when hydrated, an equilibrium water content of at least 30%, an oxygen permeability of at least 30 barrers, and a modulus of 0.3 to 1.2 MPa; the polymeric lens body comprising a plurality of primary amine functional groups provided by polymerized units of the at least one primary amine-containing methacrylate monomer or the at least one primary amine-containing methacrylamide monomer;
separating the polymeric lens body from the mold assembly;
contacting the separated polymeric lens body with an aqueous solution comprising an agent having an attached one or more complementary functional groups, forming covalent bonds between the one or more complementary functional groups of the agent and the plurality of primary amine functional groups of the polymeric lens body, thereby attaching the agent to the contacted polymeric lens body; and
packaging the contacted polymeric lens body in a contact lens packaging solution in a contact lens package to form a finished contact lens.

17. The method of claim 16, wherein the separating the polymeric lens body from the mold assembly comprises using a mechanical demolding process which does not involve applying a liquid to the polymeric lens body or the mold assembly, or the separating the polymeric lens body from the mold assembly comprises using a mechanical delensing process which does not involve applying a liquid to the polymeric lens body or a mold section.

18. The method of claim 16, wherein the contacting is conducted at a temperature of from 20 to 60° C., or is conducted at a pH of from 5.0 to 9.0, or both.

19. The method of claim 16, further comprising extracting the separated polymeric lens body, or extracting the contacted polymeric lens body, or both, to remove unreacted monomer.

20. The method of claim 16, further comprising washing the contacted polymeric lens body prior to the packaging.

21. The method of claim 16, wherein the finished contact lens has a contact angle at least 10 degrees lower than a contact angle of a contact lens made using the same polymerizable composition and using the same method of manufacture except without the step of contacting the separated polymeric lens body with the aqueous solution of the agent.

22. The method of claim 16, wherein the at least one primary amine-containing methacrylate monomer or the at least one primary amine-containing methacrylamide monomer is a) present in free base form, b) an alkane chain-containing primary amine-containing methacrylamide monomer, and wherein the alkane chain is from 2 to 8 carbons in length, and wherein the miscible polymerizable composition is free of an organic solvent or organic diluent.

* * * * *